(12) United States Patent
Imoto et al.

(10) Patent No.: US 8,625,170 B2
(45) Date of Patent: Jan. 7, 2014

(54) ILLUMINATING DEVICE, IMAGE-READING APPARATUS PROVIDED WITH THE ILLUMINATING DEVICE, AND IMAGE-FORMING APPARATUS PROVIDED WITH THE IMAGE-READING APPARATUS

(75) Inventors: Masahiro Imoto, Osaka (JP); Mitsuharu Yoshimoto, Osaka (JP); Yasuhiro Suto, Osaka (JP); Shohichi Fukutome, Osaka (JP); Kenji Nakanishi, Osaka (JP); Hisashi Yamanaka, Osaka (JP); Yoshihisa Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 271 days.

(21) Appl. No.: 13/021,889

(22) Filed: Feb. 7, 2011

(65) Prior Publication Data
US 2011/0199652 A1 Aug. 18, 2011

(30) Foreign Application Priority Data

Feb. 16, 2010 (JP) ................................. 2010-031529

(51) Int. Cl.
*H04N 1/04* (2006.01)
*F21V 7/04* (2006.01)
*G03G 15/00* (2006.01)
*G03G 15/043* (2006.01)

(52) U.S. Cl.
USPC ........... 358/474; 358/498; 358/475; 358/488; 358/484; 358/497; 362/551; 399/39; 399/52

(58) Field of Classification Search
USPC .................. 358/474, 475, 488, 498; 362/551; 399/39, 52
See application file for complete search history.

(56) References Cited

U.S. PATENT DOCUMENTS

| 5,737,096 | A  | * | 4/1998 | Takeuchi et al. | 358/475 |
| 6,744,540 | B1 | * | 6/2004 | Masuda et al.   | 358/488 |
| 7,538,911 | B2 | * | 5/2009 | Sakurai et al.  | 358/475 |
| 8,253,989 | B2 | * | 8/2012 | Nishina et al.  | 358/474 |
| 2002/0015193 | A1 | * | 2/2002 | Tabata       | 358/475 |
| 2005/0185229 | A1 | * | 8/2005 | Sano et al.  | 358/498 |
| 2007/0091633 | A1 | * | 4/2007 | Harrity et al. | 362/551 |
| 2009/0185816 | A1 | * | 7/2009 | Miyadera     | 399/52  |
| 2009/0190940 | A1 | * | 7/2009 | Miyadera     | 399/39  |
| 2010/0027079 | A1 | * | 2/2010 | Nishina et al. | 358/474 |
| 2011/0102863 | A1 | * | 5/2011 | Nakashima    | 358/475 |

FOREIGN PATENT DOCUMENTS

| JP | 07-193685  | 7/1995  |
| JP | 2001-343531 | 12/2001 |
| JP | 2004-157213 | 6/2004  |
| JP | 2005-027082 | 1/2005  |
| JP | 2005-102112 | 4/2005  |

* cited by examiner

*Primary Examiner* — Charlotte M Baker
*Assistant Examiner* — Rury Grisham
(74) *Attorney, Agent, or Firm* — Renner, Otto, Boisselle & Sklar, LLP

(57) ABSTRACT

The present invention provides an illuminating device including a plurality of light-emitting elements arranged in a line, the illuminating device illuminates an irradiation target by irradiating the irradiation target with light that is emitted from the light-emitting elements via a first and a second optical paths. In the illuminating device, a light diffusing portion for diffusing light is provided in one of the first optical path and the second optical path, and an irradiation light amount of said one of the first optical path and the second optical path in which the light diffusing portion is provided is larger than an irradiation light amount of the other optical path.

6 Claims, 26 Drawing Sheets

FIG.10

| Uneven illumination cycle [mm] | Amplitude K [%] | Inter-unevenness distance N [mm] | Unevenness M [%] | Determination |
|---|---|---|---|---|
| 5 | 1 | 2.5 | 2 | × |
| 10 | 1 | 5 | 2 | × |
| 20 | 1 | 10 | 2 | × |
| 30 | 1 | 15 | 2 | △ |
| 50 | 1 | 25 | 2 | ○ |
| 70 | 1 | 35 | 2 | ○ |
| 5 | 2.5 | 2.4 | 5 | × |
| 10 | 2.5 | 5 | 5 | × |
| 20 | 2.5 | 10 | 5 | × |
| 30 | 2.5 | 15 | 5 | × |
| 50 | 2.5 | 25 | 5 | ○ |
| 70 | 2.5 | 35 | 5 | ○ |
| 5 | 5 | 2.5 | 10 | × |
| 10 | 5 | 5 | 10 | × |
| 20 | 5 | 10 | 10 | × |
| 30 | 5 | 15 | 10 | × |
| 50 | 5 | 25 | 10 | × |
| 70 | 5 | 35 | 10 | ○ |
| 70 | 6 | 35 | 12 | △ |
| 40 | 1.25 | 20 | 2.5 | ○ |
| 60 | 2 | 30 | 4 | ○ |
| 60 | 3 | 30 | 6 | ○ |
| 60 | 3.75 | 30 | 7.5 | ○ |
| 70 | 4 | 35 | 8 | ○ |
| 40 | 2.25 | 20 | 4.5 | △ |
| 50 | 3.5 | 25 | 7 | △ |
| 60 | 4.75 | 30 | 9.5 | △ |
| 30 | 2 | 15 | 4 | × |
| 40 | 3 | 20 | 6 | × |
| 50 | 4 | 25 | 8 | × |
| 60 | 5.5 | 30 | 11 | × |

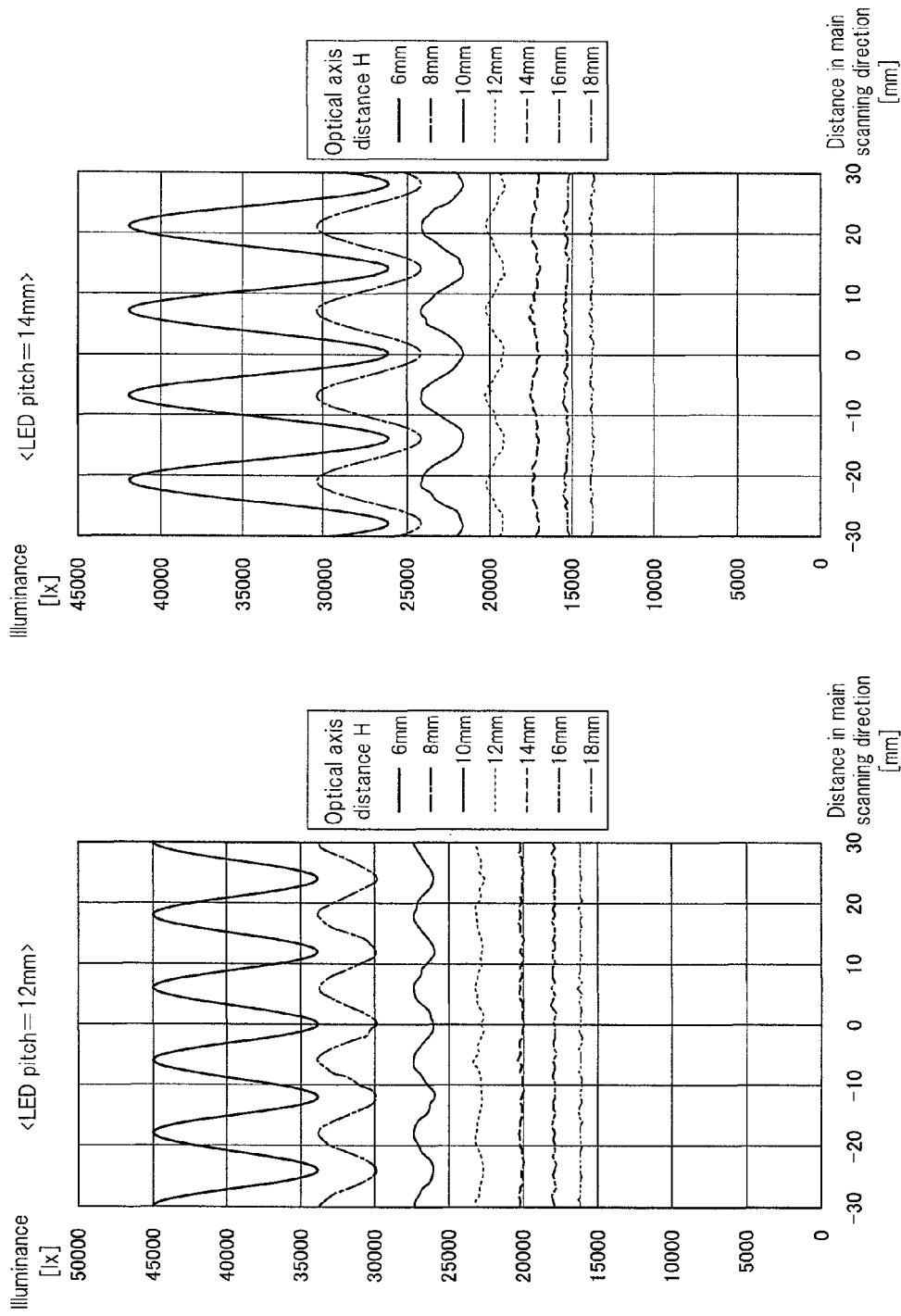

FIG.17

| Optical axis distance H (mm) | LED pitch P(mm) | | | | | | | | | | | | | | | | | | |
|---|---|---|---|---|---|---|---|---|---|---|---|---|---|---|---|---|---|---|---|
| | Unevenness | P/H | Unevenness | P/H | Unevenness | P/H | Unevenness | P/H | Unevenness | P/H | Unevenness | P/H | Unevenness | P/H | Unevenness | P/H | Unevenness | P/H | Unevenness | P/H |
| 4 | × | 1.00 | × | 1.25 | × | 1.50 | × | 1.75 | × | 2.00 | × | 2.25 | × | 2.50 | × | 2.75 |
| 5 | △ | 0.80 | × | 1.00 | × | 1.20 | × | 1.40 | × | 1.60 | × | 1.80 | × | 2.00 | × | 2.20 |
| 6 | ○ | 0.67 | △ | 0.83 | × | 1.00 | × | 1.17 | × | 1.33 | × | 1.50 | × | 1.67 | × | 1.83 |
| 7 | ○ | 0.57 | ○ | 0.71 | △ | 0.86 | × | 1.00 | × | 1.14 | × | 1.29 | × | 1.43 | × | 1.57 |
| 8 | ○ | 0.50 | ○ | 0.63 | ○ | 0.75 | △ | 0.88 | × | 1.00 | × | 1.13 | × | 1.25 | × | 1.38 |
| 9 | ○ | 0.44 | ○ | 0.56 | ○ | 0.67 | ○ | 0.78 | × | 0.89 | × | 1.00 | × | 1.11 | × | 1.22 |
| 10 | ○ | 0.40 | ○ | 0.50 | ○ | 0.60 | ○ | 0.70 | △ | 0.80 | × | 0.90 | × | 1.00 | × | 1.10 |
| 11 | ○ | 0.36 | ○ | 0.45 | ○ | 0.55 | ○ | 0.64 | △ | 0.73 | △ | 0.82 | × | 0.91 | × | 1.00 |
| 12 | ○ | 0.33 | ○ | 0.42 | ○ | 0.50 | ○ | 0.58 | ○ | 0.67 | △ | 0.75 | △ | 0.83 | × | 0.92 |
| 13 | ○ | 0.31 | ○ | 0.38 | ○ | 0.46 | ○ | 0.54 | ○ | 0.62 | ○ | 0.69 | △ | 0.77 | × | 0.85 |
| 14 | ○ | 0.29 | ○ | 0.36 | ○ | 0.43 | ○ | 0.50 | ○ | 0.57 | ○ | 0.64 | ○ | 0.71 | △ | 0.79 |
| 15 | ○ | 0.27 | ○ | 0.33 | ○ | 0.40 | ○ | 0.47 | ○ | 0.53 | ○ | 0.60 | ○ | 0.67 | △ | 0.73 |
| 16 | ○ | 0.25 | ○ | 0.31 | ○ | 0.38 | ○ | 0.44 | ○ | 0.50 | ○ | 0.56 | ○ | 0.63 | ○ | 0.69 |
| 17 | ○ | 0.24 | ○ | 0.29 | ○ | 0.35 | ○ | 0.41 | ○ | 0.47 | ○ | 0.53 | ○ | 0.59 | ○ | 0.65 |
| 18 | ○ | 0.22 | ○ | 0.28 | ○ | 0.33 | ○ | 0.39 | ○ | 0.44 | ○ | 0.50 | ○ | 0.56 | ○ | 0.61 |
| 19 | ○ | 0.21 | ○ | 0.26 | ○ | 0.32 | ○ | 0.37 | ○ | 0.42 | ○ | 0.47 | ○ | 0.53 | ○ | 0.58 |
| 20 | ○ | 0.20 | ○ | 0.25 | ○ | 0.30 | ○ | 0.35 | ○ | 0.40 | ○ | 0.45 | ○ | 0.50 | ○ | 0.55 |
| 21 | ○ | 0.19 | ○ | 0.24 | ○ | 0.29 | ○ | 0.33 | ○ | 0.38 | ○ | 0.43 | ○ | 0.48 | ○ | 0.52 |
| 22 | ○ | 0.18 | ○ | 0.23 | ○ | 0.27 | ○ | 0.32 | ○ | 0.36 | ○ | 0.41 | ○ | 0.45 | ○ | 0.50 |
| 23 | ○ | 0.17 | ○ | 0.22 | ○ | 0.26 | ○ | 0.30 | ○ | 0.35 | ○ | 0.39 | ○ | 0.43 | ○ | 0.48 |
| 24 | ○ | 0.17 | ○ | 0.21 | ○ | 0.25 | ○ | 0.29 | ○ | 0.33 | ○ | 0.38 | ○ | 0.42 | ○ | 0.46 |

○: Uneven illumination is sufficiently acceptable
△: Uneven illumination is at acceptable limit
×: Uneven illumination is not acceptable

FIG.18

| Optical axis distance H (mm) | LED pitch P(mm) | | | | | | | | | | | | | | | | |
|---|---|---|---|---|---|---|---|---|---|---|---|---|---|---|---|---|---|
| | 12 | | 13 | | 14 | | 15 | | 16 | | 17 | | 18 | | 19 | |
| | P/H | Uneven-ness | P/H | Uneven-ness | P/H | Uneven-ness | P/H | Uneven-ness | P/H | Uneven-ness | P/H | Uneven-ness | P/H | Uneven-ness | P/H | Uneven-ness |
| 4 | 3.00 | × | 3.25 | × | 3.50 | × | 3.75 | × | 4.00 | × | 4.25 | × | 4.50 | × | 4.75 | × |
| 5 | 2.40 | × | 2.60 | × | 2.80 | × | 3.00 | × | 3.20 | × | 3.40 | × | 3.60 | × | 3.80 | × |
| 6 | 2.00 | × | 2.17 | × | 2.33 | × | 2.50 | × | 2.67 | × | 2.83 | × | 3.00 | × | 3.17 | × |
| 7 | 1.71 | × | 1.86 | × | 2.00 | × | 2.14 | × | 2.29 | × | 2.43 | × | 2.57 | × | 2.71 | × |
| 8 | 1.50 | × | 1.63 | × | 1.75 | × | 1.88 | × | 2.00 | × | 2.13 | × | 2.25 | × | 2.38 | × |
| 9 | 1.33 | × | 1.44 | × | 1.56 | × | 1.67 | × | 1.78 | × | 1.89 | × | 2.00 | × | 2.11 | × |
| 10 | 1.20 | × | 1.30 | × | 1.40 | × | 1.50 | × | 1.60 | × | 1.70 | × | 1.80 | × | 1.90 | × |
| 11 | 1.09 | × | 1.18 | × | 1.27 | × | 1.36 | × | 1.45 | × | 1.55 | × | 1.64 | × | 1.73 | × |
| 12 | 1.00 | × | 1.08 | × | 1.17 | × | 1.25 | × | 1.33 | × | 1.42 | × | 1.50 | × | 1.58 | × |
| 13 | 0.92 | × | 1.00 | × | 1.08 | × | 1.15 | × | 1.23 | × | 1.31 | × | 1.38 | × | 1.46 | × |
| 14 | 0.86 | × | 0.93 | × | 1.00 | × | 1.07 | × | 1.14 | × | 1.21 | × | 1.29 | × | 1.36 | × |
| 15 | 0.80 | △ | 0.87 | △ | 0.93 | × | 1.00 | × | 1.07 | × | 1.13 | × | 1.20 | × | 1.27 | × |
| 16 | 0.75 | △ | 0.81 | △ | 0.88 | △ | 0.94 | × | 1.00 | × | 1.06 | × | 1.13 | × | 1.19 | × |
| 17 | 0.71 | ○ | 0.76 | △ | 0.82 | △ | 0.88 | × | 0.94 | × | 1.00 | × | 1.06 | × | 1.12 | × |
| 18 | 0.67 | ○ | 0.72 | ○ | 0.78 | △ | 0.83 | △ | 0.89 | × | 0.94 | × | 1.00 | × | 1.06 | × |
| 19 | 0.63 | ○ | 0.68 | ○ | 0.74 | △ | 0.79 | △ | 0.84 | × | 0.89 | × | 0.95 | × | 1.00 | × |
| 20 | 0.60 | ○ | 0.65 | ○ | 0.70 | ○ | 0.75 | △ | 0.80 | △ | 0.85 | × | 0.90 | × | 0.95 | × |
| 21 | 0.57 | ○ | 0.62 | ○ | 0.67 | ○ | 0.71 | ○ | 0.76 | △ | 0.81 | × | 0.86 | × | 0.90 | × |
| 22 | 0.55 | ○ | 0.59 | ○ | 0.64 | ○ | 0.68 | ○ | 0.73 | △ | 0.77 | △ | 0.82 | △ | 0.86 | × |
| 23 | 0.52 | ○ | 0.57 | ○ | 0.61 | ○ | 0.65 | ○ | 0.70 | ○ | 0.74 | △ | 0.78 | △ | 0.83 | △ |
| 24 | 0.50 | ○ | 0.54 | ○ | 0.58 | ○ | 0.63 | ○ | 0.67 | ○ | 0.71 | ○ | 0.75 | ○ | 0.79 | △ |

○: Uneven illumination is sufficiently acceptable
△: Uneven illumination is at acceptable limit
×: Uneven illumination is not acceptable

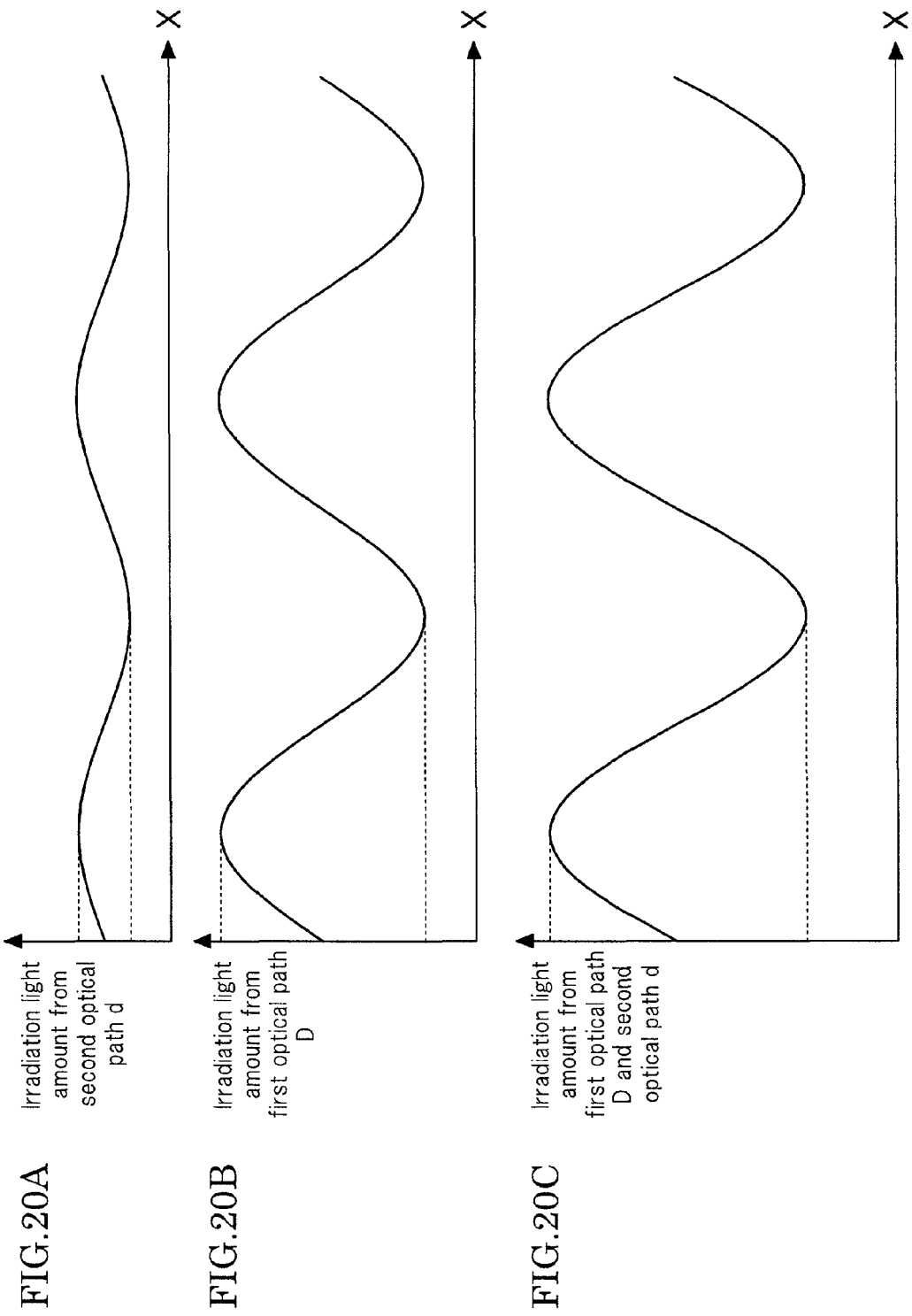

ILLUMINATING DEVICE, IMAGE-READING APPARATUS PROVIDED WITH THE ILLUMINATING DEVICE, AND IMAGE-FORMING APPARATUS PROVIDED WITH THE IMAGE-READING APPARATUS

BACKGROUND OF THE INVENTION

This application claims priority under 35 U.S.C. §119(a) on Patent Application No. 2010-031529 filed in Japan on Feb. 16, 2010, the entire contents of which are herein incorporated by reference.

The present invention relates to an illuminating device for illuminating an irradiation target such as a document, an image-reading apparatus provided with the illuminating device, and an image-forming apparatus provided with the image-reading apparatus.

This type of illuminating device is used mounted on, for example, an image-reading apparatus, is provided with a plurality of light-emitting elements (e.g., LEDs) that are arranged in a line parallel to a main-scanning direction for reading a document, and illuminates a document using these light-emitting elements. The image-reading apparatus repeatedly scans a document illuminated by the illuminating device in the main-scanning direction, and, at the same time, scans the document also in a sub-scanning direction, thereby reading the entire document. An image of this read document is output to a printer or the like, and recorded on recording paper.

In such an illuminating device, as the number of the light-emitting elements increases, a higher illuminance can be achieved. However, because of a high unit cost of the light-emitting element, it is desirable to reduce the number of the light-emitting elements to reduce the cost and also the power consumption.

Also, the light-emitting elements have a narrow directivity, the light intensity of the light-emitting elements in the optical axis direction is strong, and the light intensity decreases as the light deviates from the optical axis, and thus uneven illumination in which the bright spot of the light-emitting elements is reflected in a document reading range readily occurs, and it is desirable to reduce uneven illumination.

In order to solve such problems, JP 2005-102112A (Patent Document 1) discloses a technique in which a condensing element is provided in the light-emitting direction of the respective light-emitting elements, such that almost all of the light emitted from the light-emitting elements is caused to be incident on the incident-side lens of the condensing element and are emitted from the condensing element onto a document reading range, or such that, by forming a prismatic surface in a part of the condensing element or providing a reflecting plate as a separate element from the condensing element, light that has been transmitted through the condensing element is reflected by the prismatic surface or the reflecting plate so as to allow the light to be emitted toward the document reading range, thereby reducing the light loss. Such reduction of the light loss enables reduction of the number of light-emitting elements.

Also in JP 2001-343531A (Patent Document 2), in a configuration in which light of the light-emitting elements is emitted onto an irradiation target via a light guide plate, the light emitting face of the light guide plate is given a light diffusing function to diffuse light by the light emitting face of the light guide plate, thereby reducing uneven illumination on the irradiation target. With such a configuration, even though the number of light-emitting elements is small, uneven illumination hardly occurs.

However, in the technique of Patent Document 1, although the light loss can be reduced, no particular measure to reduce uneven illumination is disclosed.

Also in Patent Document 2, while uneven illumination on the irradiation target is reduced by diffusing light by the light emitting face of the light guide plate, the light loss increases due to such diffusion of light, which results in a significant decrease in the irradiation light amount onto the irradiation target.

The present invention was arrived at in view of the above-described conventional problem, and it is an object thereof to provide an illuminating device capable of effectively reducing the light loss while suppressing uneven illumination by a plurality of light-emitting elements, an image-reading apparatus including such an illuminating device, and an image-forming apparatus including such an image-reading apparatus.

SUMMARY OF THE INVENTION

In order to solve the above issues, an illuminating device of the present invention includes a plurality of light-emitting elements arranged in a line, the illuminating device illuminating an irradiation target by irradiating the irradiation target with light that is emitted from the light-emitting elements via a first and a second optical paths, in which a light diffusing portion for diffusing light is provided in one of the first optical path and the second optical path, and an irradiation light amount of said one of the first optical path and the second optical path in which the light diffusing portion is provided is larger than an irradiation light amount of the other optical path.

Here, the bright spots of the light-emitting elements are more readily reflected by the irradiation target with one of the first optical path and the second optical path having a larger irradiation light amount on the irradiation target than with the other optical path having a smaller irradiation light amount, and thus uneven illumination tends to be aggravated. Therefore, the light diffusing portion is provided in one of the first optical path and the second optical path having a larger irradiation light amount on the irradiation target to diffuse light, thereby reducing uneven illumination in the irradiation target.

Also, with the illuminating device of the present invention, the first optical path may be an optical path in which light emitted from the light-emitting elements is irradiated on the irradiation target directly or after having been transmitted through a light-transmitting member, and the second optical path may be an optical path in which light emitted from the light-emitting elements is reflected by a reflecting member and irradiated on the irradiation target.

In such a configuration, the first optical path is a straight optical path in which light emitted from the light-emitting elements reaches the irradiation target directly or after having been transmitted through a light-transmitting member, and the second optical path is a bent optical path in which light emitted from the light-emitting elements is reflected by the reflecting member and reaches the irradiation target, these optical paths being mutually different.

For example, the light diffusing portion is provided in the first optical path in which light emitted from the light-emitting elements is irradiated on the irradiation target directly or after having been transmitted through the light-transmitting member. Here, assuming that the irradiation light amount irradiated on the irradiation target via the straight optical path is larger than the irradiation light amount irradiated on the irradiation target via the other bent optical path, the light diffusing portion is provided in the straight optical path.

Furthermore, the illuminating device of the present invention may include a light-transmitting member that guides light emitted from the light-emitting elements toward the irradiation target; and a reflecting member that reflects light that is emitted from the light-emitting elements and transmitted through the light-transmitting member to illuminate the irradiation target, in which the first optical path may be an optical path in which light emitted from the light-emitting elements is transmitted through the light-transmitting member and irradiated on the irradiation target, and the second optical path may be an optical path in which light emitted from the light-emitting elements is transmitted through the light-transmitting member, reflected by the reflecting member and irradiated on the irradiation target.

That is, the first optical path is a straight optical path in which light emitted from the light-emitting elements is transmitted through the light-transmitting member and irradiated on the irradiation target, and the second optical path is a bent optical path in which light is emitted from the light-emitting elements, transmitted through the light-transmitting member, reflected by the reflecting member and reaches the irradiation target. These optical paths are mutually different.

For example, the light diffusing portion is provided in the first optical path in which light emitted from the light-emitting elements is transmitted through the light-transmitting member and irradiated on the irradiation target. Also in this case, assuming that the irradiation light amount irradiated on the irradiation target via the straight optical path is larger than the irradiation light amount irradiated on the irradiation target via the other bent optical path, the light diffusing portion is provided in the straight optical path.

Also, the illuminating device of the present invention may include two lines of light-emitting elements, each line including a plurality of light-emitting elements arranged in a line, in which said one of the first optical path and the second optical path may be an optical path in which light emitted from one of the two lines is irradiated on the irradiation target, and the other optical path may be an optical path in which light emitted from the other line is irradiated on the irradiation target.

In this manner, the first optical path and the second optical path are formed also in a configuration in which two lines of light-emitting elements are included, each line including a plurality of light-emitting elements arranged in a line. Therefore, the light diffusing portion is provided in one of the first optical path and the second optical path having a larger irradiation light amount on the irradiation target.

Also, with the illuminating device of the present invention, the light diffusing portion may be provided in a portion of the light-transmitting member that is closer to the irradiation target than to the light-emitting elements.

In the case where the light diffusing portion is provided near the irradiation target in this manner, light that is transmitted through the light diffusing portion is incident on the irradiation target before being diffused over a wider area. In this case, although part of the light is reflect toward the light source side on the inner face of the light diffusing portion, such light is reflected again at a portion of the light-transmitting member on the light source side where the light diffusing portion is not provided. Therefore, the amount of light loss is small.

Alternatively, with the illuminating device of the present invention, the light diffusing portion is provided in a portion of the light-transmitting member that is closer to the light-emitting elements than to the irradiation target.

In the case where the light diffusing portion is provided near the light-emitting elements in this manner, light that is transmitted thorough the light diffusing portion is incident on the irradiation target after being diffused over a wider area. In this case, since the distance to the irradiation target is made longer, it is possible to irradiate the irradiation target with light more diffused.

Thus, the degree of diffusion of light incident on the irradiation target can be set by adjusting the position of the light diffusing portion.

Also, with the illuminating device of the present invention, the light diffusing portion may be formed by roughening a surface of a light-transmitting member provided in an optical path having a larger irradiation light amount on the irradiation target, applying a coat of light dispersion paint to the surface of the light-transmitting member, or dispersing light dispersing particles in the light-transmitting member.

Any of roughening the surface of the light-transmitting member, application of a coat of light dispersion paint to the surface of the light-transmitting member, or dispersing light dispersing particles in the light-transmitting member may be used.

Meanwhile, an image-reading apparatus of the present invention includes the illuminating device of the present invention.

Moreover, an image-forming apparatus of the present invention includes the image-reading apparatus of the present invention.

These image-reading apparatus and image-forming apparatus of the present invention also exhibit the same working effects as the illuminating device of the present invention.

In this manner, accordingly to the present invention, with one of the first optical path and the second optical path having a larger irradiation light amount on the irradiation target, the bright spots of the light-emitting elements are readily reflected by the irradiation target, but the light diffusing portion is provided in one of the first optical path and the second optical path having a larger irradiation light amount on the irradiation target, and thus light is diffused and uneven illumination is reduced.

BRIEF DESCRIPTION OF THE DRAWINGS

FIG. 10 is a chart in which the correspondence among an uneven illumination cycle T, an optical axis distance H and an illumination unevenness M or the like is shown.

FIG. 13 includes FIGS. 13A and 13B, each showing a graph that illustrates, at one of the LED pitch values employed in the analysis simulation, the irradiation light amount [lx] on the light irradiated face of the document with respect to the distance in the main scanning direction [mm] at several values of the optical axis distance.

FIG. 14 includes FIGS. 14A and 14B, each showing a graph that illustrates, at one of the LED pitch values employed in the analysis simulation, the irradiation light amount [lx] on the light irradiated face of the document with respect to the distance in the main scanning direction [mm] at several values of the optical axis distance. FIGS. 14A and 14B show graphs of the LED pitches of 12 mm and 14 mm, respectively.

FIG. 15 includes FIGS. 15A and 15B, each showing a graph that illustrates, at one of the LED pitch values employed in the analysis simulation, the irradiation light amount [lx] on the light irradiated face of the document with respect to the distance in the main scanning direction [mm] at several values of the optical axis distance.

FIG. 17 is a diagram showing P/H determination results obtained when the LED pitch is a value ranging from 4 mm to 11 mm in increments of 1 mm, and the optical axis distance is a value ranging from 4 mm to 24 mm in increments of 1 mm.

FIG. 18 is a diagram showing P/H determination results obtained when the LED pitch is a value ranging from 12 mm to 19 mm in increments of 1 mm, and the optical axis distance is a value ranging from 4 mm to 24 mm in increments of 1 mm.

FIG. 20 includes FIGS. 20A, 20B and 20C. FIG. 20A shows the fluctuation in a main scanning direction X of the irradiation light amount from a second optical path. FIG. 20B shows the fluctuation in the main scanning direction X of the irradiation light amount when light emitted from the LED array is incident directly on the document via a first optical path. FIG. 20C shows the sum of the irradiation light amount in FIG. 20A and the irradiation light amount in FIG. 20B.

FIG. 21 includes FIGS. 21A, 21B and 21C.

DETAILED DESCRIPTION OF THE INVENTION

Hereinafter, embodiments of the present invention will be described in detail with reference to the attached drawings.

Figure 1:
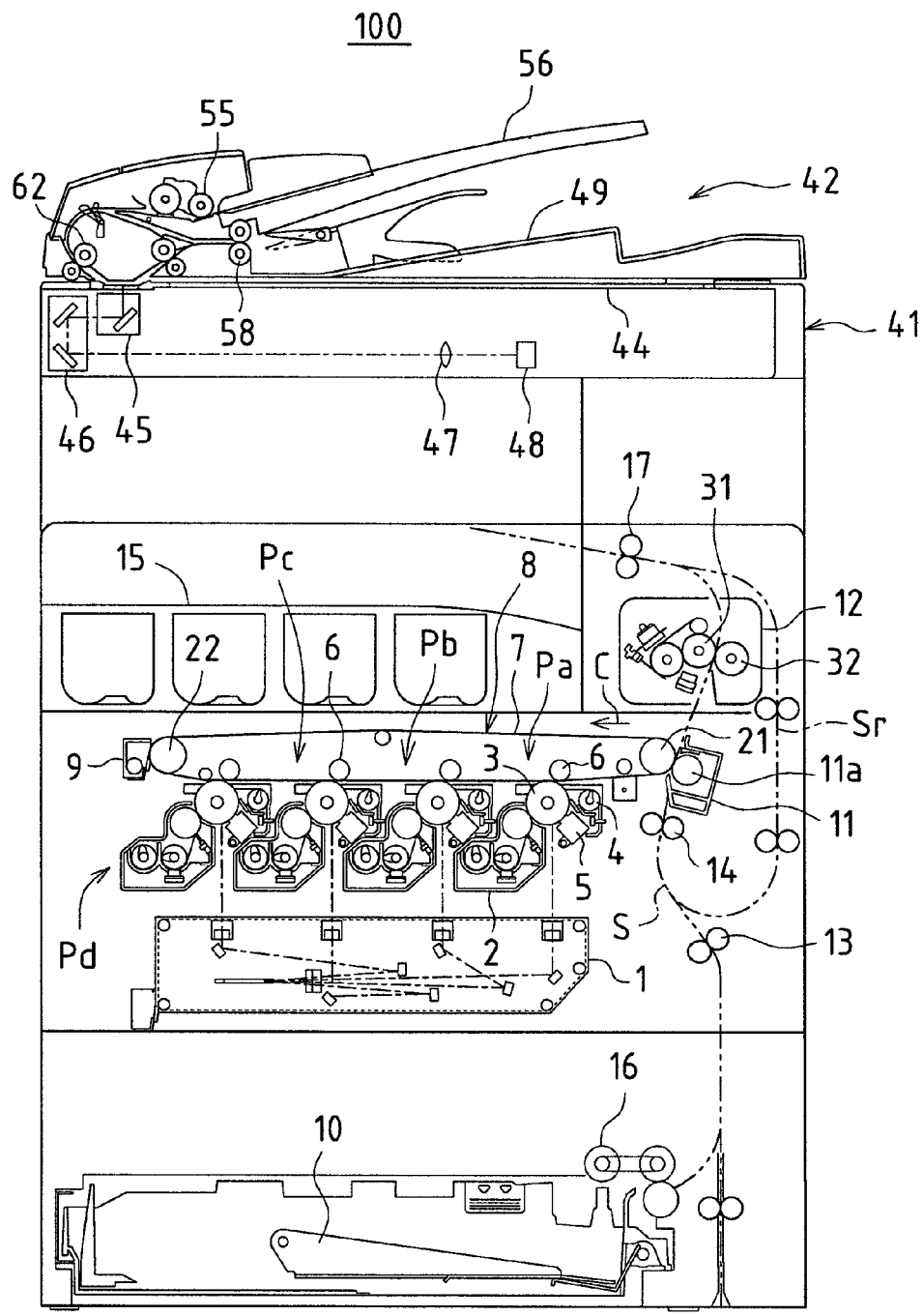
FIG. 1 is a cross-sectional view showing an image-forming apparatus provided with an image-reading apparatus to which an illuminating device according to a first embodiment of the present invention has been applied.

FIG. 1 is a cross-sectional view showing an image-forming apparatus provided with an image-reading apparatus to which an illuminating device according to a first embodiment of the present invention has been applied. An image-forming apparatus 100 is a so-called multifunction peripheral having a scanner function, a copy function, a printer function, and a facsimile function, for example. The image-forming apparatus 100 transmits an image of a document read by an image-reading apparatus 41 to the outside (this function corresponds to a scanner function), and forms and records on recording paper, in color or monochrome, an image of the read document or an image received from the outside (this function corresponds to a copy function, a printer function, and a facsimile function).

The image-forming apparatus 100 is provided with a laser exposure device 1, development apparatuses 2, photosensitive drums 3, charging units 5, cleaner devices 4, an intermediate transfer belt device 8, a fixing device 12, a paper transport path S, a paper feed tray 10, a paper discharge tray 15, and the like, in order to print an image on recording paper.

Image data processed in the image-forming apparatus 100 corresponds to a color image using colors consisting of black (K), cyan (C), magenta (M), and yellow (Y), or corresponds to a monochrome image using a monochrome color (e.g., black). Accordingly, four development apparatuses 2, four photosensitive drums 3, four charging units 5, and four cleaner devices 4 are arranged so as to form four types of toner images corresponding to the respective colors. Respectively corresponding to black, cyan, magenta, and yellow, they form four image stations Pa, Pb, Pc, and Pd.

The photosensitive drums 3 have photosensitive layers on their surfaces. The charging units 5 are charging means for uniformly charging the surfaces of the photosensitive drums 3 to a predetermined potential. As the charging units 5, a contact-type charging unit using a roller or brush, or a charger-type charging unit is used.

The laser exposure device 1 is a laser scanning unit (LSU) provided with laser diodes and reflecting mirrors, and causes the charged surfaces of the photosensitive drums 3 to be exposed to light according to image data to form electrostatic latent images corresponding to the image data on the charged surfaces.

The development apparatuses 2 develop the electrostatic latent images formed on the surfaces of the respective photosensitive drums 3 using toner of the respective colors, and form toner images on the surfaces of the photosensitive drums 3. The cleaner devices 4 remove and recover toner remaining on the surfaces of the respective photosensitive drums 3 after development and image transfer.

The intermediate transfer belt device 8 is disposed above the photosensitive drums 3, and provided with an intermediate transfer belt 7, an intermediate transfer belt-driving roller 21, an idler roller 22, four intermediate transfer rollers 6, and an intermediate transfer belt-cleaning apparatus 9.

The intermediate transfer belt 7 is obtained by forming a film having a thickness of approximately 100 μm to 150 μm into an endless belt. The intermediate transfer belt-driving roller 21, the intermediate transfer rollers 6, the idler roller 22, and the like support the intermediate transfer belt 7 in a tensioned state, and circumferentially move the intermediate transfer belt 7 in the arrow C direction.

The intermediate transfer rollers 6 are supported in a rotatable manner near the intermediate transfer belt 7, and pressed via the intermediate transfer belt 7 against the respective photosensitive drums 3.

The toner images on the surfaces of the photosensitive drums 3 are sequentially transferred and superimposed on the intermediate transfer belt 7, and a color toner image (a toner image containing the above-described colors) is formed on the intermediate transfer belt 7. The toner images are transferred from the photosensitive drums 3 to the intermediate transfer belt 7, using the intermediate transfer rollers 6 pressed against the back face of the intermediate transfer belt 7. The intermediate transfer rollers 6 are rollers including a base that is made of a metal (e.g., stainless steel) shaft having a diameter of 8 to 10 mm, and an electrically conductive elastic material (e.g., EPDM, urethane foam, etc.) that covers the surface of the shaft. In order to transfer the toner images, a high-voltage transfer bias (a high voltage of the opposite polarity (+) to the charge polarity (−) of the toner) is applied to the intermediate transfer rollers 6, and the electrically conductive elastic material enables a high voltage to be uniformly applied to recording paper.

In this manner, the toner images on the surfaces of the photosensitive drums 3 are superimposed on the intermediate transfer belt 7, and form a color toner image represented by the image data. This color toner image is transported together with the intermediate transfer belt 7, and transferred to recording paper at a nip region between the intermediate transfer belt 7 and a transfer roller 11*a* of a secondary transfer apparatus 11.

A voltage (a high voltage of the opposite polarity (+) to the charge polarity (−) of the toner) for transferring the toner image containing the above-described colors on the intermediate transfer belt 7 to the recording paper is applied to the transfer roller 11*a* of the secondary transfer apparatus 11. Furthermore, in order to constantly maintain the nip region between the intermediate transfer belt 7 and the transfer roller 11*a* of the secondary transfer apparatus 11, one of the transfer roller 11*a* of the secondary transfer apparatus 11 and the intermediate transfer belt-driving roller 21 is made of a hard material (metal, etc.), and the other is made of a soft material such as an elastic material (elastic rubber, foamable resin, etc.).

The toner image on the intermediate transfer belt 7 may not be completely transferred by the secondary transfer apparatus 11 to the recording paper, and toner may remain on the intermediate transfer belt 7. This residual toner causes toner color mixing in the following step. Accordingly, residual toner is removed and recovered by the intermediate transfer belt-cleaning apparatus 9. The intermediate transfer belt-cleaning apparatus 9 includes, for example, a cleaning blade that is in contact with the intermediate transfer belt 7 and removes the residual toner as a cleaning member. The idler roller 22 supports the intermediate transfer belt 7 from the back face at a point where the cleaning blade is in contact with the intermediate transfer belt 7.

After the color toner image is transferred at the nip region between the intermediate transfer belt 7 and the transfer roller 11*a* of the secondary transfer apparatus 11, the recording paper is transported to the fixing device 12. The fixing device 12 is provided with a heated roller 31, a pressure roller 32, and the like, and the recording paper is sandwiched between the heated roller 31 and the pressure roller 32 and transported.

The heated roller 31 is controlled so as to be at a predetermined fixing temperature based on detection output of a temperature detector (not shown), and applies thermo-compression to the recording paper with the pressure roller 32, and thus melts, mixes, and presses the color toner image transferred to the recording paper, and thermally fixes the color toner image to the recording paper.

Meanwhile, the paper feed tray 10 is a tray in which recording paper is stored. The paper feed tray 10 is disposed in the lower portion in the image-forming apparatus 100, and supplies the recording paper in the paper feed tray 10.

The image-forming apparatus 100 includes an S-shaped paper transport path S for transporting the recording paper supplied from the paper feed tray 10 via the secondary transfer apparatus 11 and the fixing device 12 into the paper discharge tray 15. Along the paper transport path S, a paper pickup roller 16, paper registration rollers 14, the fixing device 12, transport rollers 13, paper discharge rollers 17, and the like are arranged.

The paper pickup roller 16 is a draw-in roller that is disposed at an end portion of the paper feed tray 10 and that feeds recording paper sheet by sheet from the paper feed tray 10 into the paper transport path S. The transport rollers 13 are a plurality of pairs of small rollers for promoting and assisting transportation of recording paper.

The paper registration rollers 14 temporarily stop recording paper that has been transported, adjust the position of the leading edge of the recording paper, and transport the recording paper with good timing matched with the rotation of the photosensitive drums 3 and the intermediate transfer belt 7 such that the color toner image on the intermediate transfer belt 7 is transferred to the recording paper at the nip region between the intermediate transfer belt 7 and the transfer roller 11*a* of the secondary transfer apparatus 11.

For example, based on detection output of a pre-registration detection switch (not shown), the paper registration rollers 14 transport the recording paper such that the leading edge of the color toner image on the intermediate transfer belt 7 matches the leading edge of the image formation region of the recording paper in the nip region between the intermediate transfer belt 7 and the transfer roller 11*a* of the secondary transfer apparatus 11.

Furthermore, the color toner image is fixed to the recording paper at the fixing device 12. After the recording paper passes through the fixing device 12, the recording paper is discharged facedown by the paper discharge rollers 17 onto the paper discharge tray 15.

Furthermore, when performing printing not only on the front face of the recording paper but also on the back face, the paper discharge rollers 17 on the paper transport path S are stopped and then rotated in reverse during transportation of the recording paper by the paper discharge rollers 17, the recording paper is passed through a reversing path Sr where the front and the back of the recording paper are reversed, and then the recording paper is guided to the paper registration rollers 14. Subsequently, as in the case of the front face of the recording paper, an image is recorded and fixed to the back face of the recording paper, and the recording paper is discharged onto the paper discharge tray 15.

Figure 2:
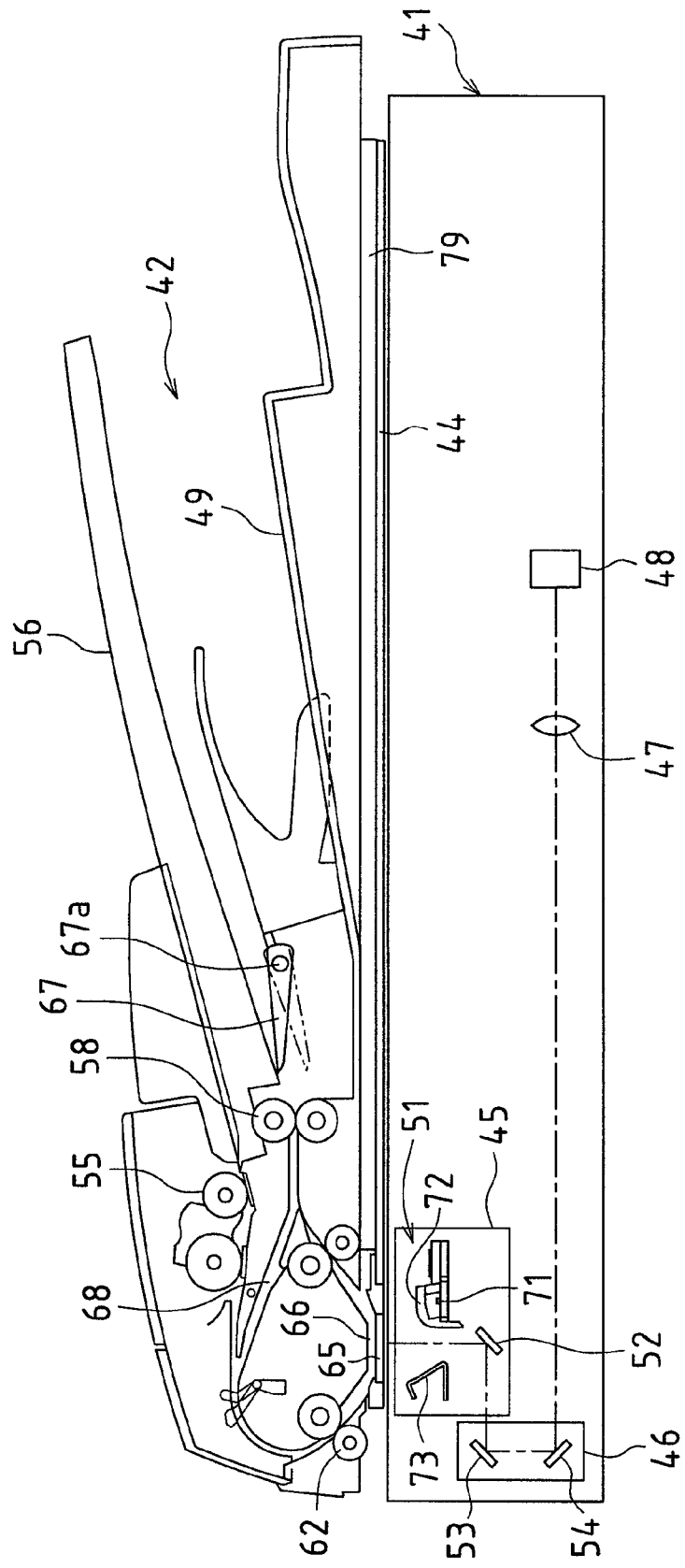
FIG. 2 is an enlarged cross-sectional view showing the image-reading apparatus and a document-transporting apparatus of FIG. 1.

Next, the image-reading apparatus 41 and a document-transporting apparatus 42 will be described in detail. FIG. 2 is an enlarged cross-sectional view showing the image-reading apparatus 41 and the document-transporting apparatus 42.

The rear side of the document-transporting apparatus 42 is axially supported by a hinge (not shown) on the rear side the image-reading apparatus 41, and the document-transporting apparatus 42 is opened or closed by lifting or lowering its front portion. When the document-transporting apparatus 42 is opened, a platen glass 44 of the image-reading apparatus 41 is exposed, and a document is placed on the platen glass 44.

The image-reading apparatus 41 is provided with the platen glass 44, a first scanning unit 45, a second scanning unit 46, an imaging lens 47, a charge coupled device (CCD) 48, and the like. The first scanning unit 45 is provided with an illuminating device 51 and a first reflecting mirror 52. While the first scanning unit 45 is moving at a constant speed V by a distance according to the document size in a sub-scanning direction Y, the document on the platen glass 44 is exposed to light by the illuminating device 51 and the reflected light is reflected by the first reflecting mirror 52 and guided to the second scanning unit 46, and, thus, the image on the document surface is scanned in the sub-scanning direction Y. The second scanning unit 46 is provided with a second reflecting mirror 53 and a third reflecting mirror 54. While the second scanning unit 46 is moving following the first scanning unit 45 at a speed V/2, the reflected light from the document is reflected by the second reflecting mirror 53 and the third reflecting mirror 54 and guided to the imaging lens 47. The imaging lens 47 condenses the reflected light from the document onto the CCD 48, and forms the image on the document surface on the CCD 48. The CCD 48 repeatedly scans the image on the document in the main-scanning direction, and outputs analog image signals for one main scanning line after each scan.

The first and the second scanning units 45 and 46 respectively include pulleys (not shown). A wire (not shown) is wound around these pulleys, the wire is driven by a stepping motor, and, thus, the first and the second scanning units 45 and 46 are moved in synchronization.

Furthermore, the image-reading apparatus 41 can read not only a document that is being stopped but also an image on the surface of a document that is being transported by the document-transporting apparatus 42. In this case, as shown in FIG. 2, the first scanning unit 45 is moved to a reading range below a document-reading glass 65, and the second scanning unit 46 is positioned according to the position of the first scanning unit 45. Then, in this state, the document-transporting apparatus 42 starts to transport the document.

In the document-transporting apparatus 42, a pickup roller 55 is pressed against a document on a document tray 56 and rotated, the document is drawn in and transported, the leading edge of the document is collided with registration rollers 62 and its position is adjusted. After the adjustment, the document is passed through a point between the document-reading glass 65 and a reading guide plate 66 and discharged from paper discharge rollers 58 onto a paper discharge tray 49.

While the document is being transported, the illuminating device 51 of the first scanning unit 45 illuminates the document surface via the document-reading glass 65, the reflected light from the document surface is guided by the reflecting mirrors 52 to 54 of the first and the second scanning units 45 and 46 to the imaging lens 47. The reflected light is condensed by the imaging lens 47 onto the CCD 48, the image on the document surface is formed on the CCD 48, and, thus, the image on the document surface is read.

Furthermore, when reading the back face of the document, an intermediate tray 67 is rotated about a shaft 67a as indicated by the dotted line, the paper discharge rollers 58 are stopped during discharge of the document from the paper discharge rollers 58 onto the paper discharge tray 49, and, thus, the document is received by the intermediate tray 67. Then, the paper discharge rollers 58 are rotated in reverse, the document is guided via a reverse transport path 68 to the registration rollers 62, and, thus, the front and the back of the document are reversed. Then, as in the case of the image on the front face of the document, the image on the back face of the document is read, the intermediate tray 67 is returned to its position indicated by the solid line, and the document is discharged from the paper discharge rollers 58 onto the paper discharge tray 49.

In this manner, the image on the document surface thus read by the CCD 48 is output from the CCD 48 as analog image signals, and these analog image signals are A/D converted into digital image signals. These digital image signals are subjected to various types of image processing and then transmitted to and received by the laser exposure device 1 of the image-forming apparatus 100, the image is recorded on recording paper in the image-forming apparatus 100, and this recording paper is output as a photocopied document.

The document on the platen glass 44 or the document-reading glass 65 is illuminated by the illuminating device 51 of the first scanning unit 45. Here, it is desirable to reduce the light loss by causing almost all of the light emitted from an LED array 71 of the illuminating device 51 to be incident on the document.

Also, as described in detail later, while the LED array 71 is configured by arranging a plurality of LEDs in a line, the directivity of the LEDs is narrow, and uneven illumination in which the bright spot of the LEDs are reflected in the document readily occurs. Therefore, it is desirable to suppress this uneven illumination.

Thus, the illuminating device 51 of this embodiment includes a light-guiding member (light-transmitting member) 72 that guides the light emitted from the LED array 71 directly toward the document and also toward a reflecting plate 73, and the light-reflecting plate 73 that reflects the light guided by the light-guiding member 72 toward the document. That is, a first optical path in which light travels from the LED array 71 to the document while being transmitted through the light-guiding member 72 and a second optical path in which light travels from the LED array 71 to the document while being transmitted through the light-guiding member 72 and reflected by the light-reflecting plate 73 are set. The document is thus illuminated by light via mutually different paths, namely, the first optical path and the second optical path. In this manner, almost all of the light emitted from the LED array 71 is caused to be incident on the document, and thus the light loss can be reduced.

Furthermore, a light diffusing portion is provided on a surface portion of the light-guiding member 72 through which light in the first optical path is transmitted, the light in the first optical path is appropriately diffused by the light diffusing portion, and the diffused light is irradiated onto the document, thereby reducing uneven illumination on the document.

Figure 3:
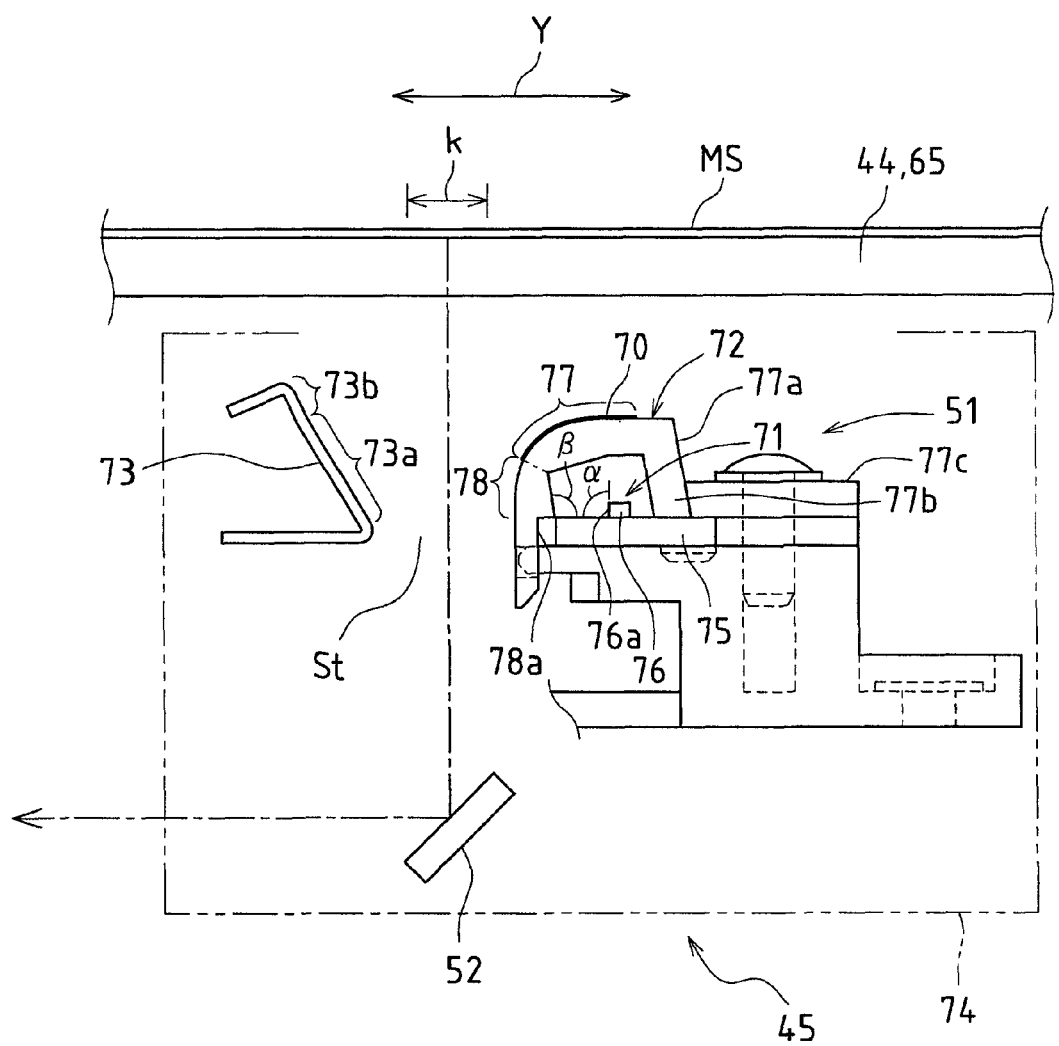
FIG. 3 is a cross-sectional view schematically showing a first scanning unit in the image-reading apparatus.
Figure 4:
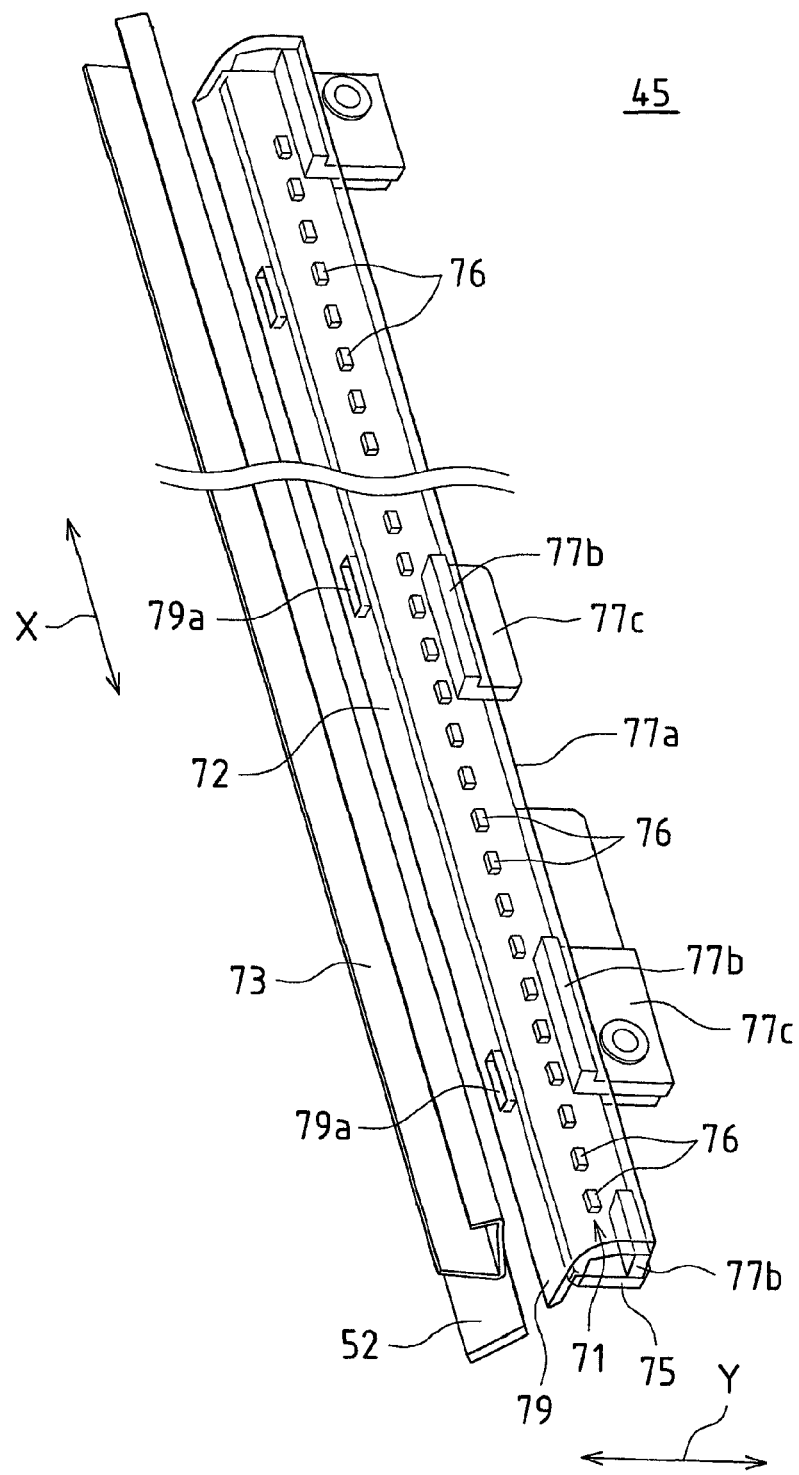
FIG. 4 is a perspective view schematically showing the first scanning unit of FIG. 3.

Next, the configuration of the illuminating device 51 of the first embodiment will be described in detail. FIG. 3 is a cross-sectional view schematically showing the first scanning unit 45. FIG. 4 is a perspective view schematically showing the first scanning unit 45.

As clearly seen in FIGS. 3 and 4, the first scanning unit 45 is provided with the illuminating device 51, the first reflecting mirror 52, and a moving scanning frame 74. The illuminating device 51 and the first reflecting mirror 52 are mounted on the moving scanning frame 74, both ends of the moving scanning frame 74 are slidably supported, and the moving scanning frame 74 is moved in the sub-scanning direction Y by the pulley, the wire, and the stepping motor.

The illuminating device 51 is provided with a substrate 75, the LED array 71 mounted on the substrate 75, the light-guiding member 72 supported by the substrate 75 in a fixed manner, and the reflecting plate 73. All of the substrate 75, the LED array 71, the light-guiding member 72, and the reflecting plate 73 are arranged such that their longitudinal direction is in the main-scanning direction X for reading a document MS, and have a length similar to that of the reading range in the main-scanning direction X.

The LED array 71 is configured from a plurality of LEDs 76 that are arranged in a line in the main-scanning direction X on the substrate 75. Each LED 76 is connected to a wiring pattern of the substrate 75, and the wiring pattern of the substrate 75 is connected via a harness (not shown) to a driver circuit (not shown) mounted on the moving scanning frame 74. This driver circuit supplies electrical power via the harness and the wiring pattern of the substrate 75 to each LED 76, and turns the LED 76 on and off.

The light-guiding member 72 is made of translucent synthetic resin (polycarbonate, acrylic, etc.) or glass, and has a direct emitting portion 77 that is disposed between the LED array 71 and an illumination range k centered about a document reading reference position on the surface of the platen glass 44 and the document-reading glass 65, and an indirect emitting portion 78 that is disposed between the reflecting plate 73 and the LED array 71. The direct emitting portion 77 and the indirect emitting portion 78 are linked to each other and formed in one piece, and the direct emitting portion 77 and the indirect emitting portion 78 cover the surface side of the substrate 75. The direct emitting portion 77 covers a portion obliquely above the substrate 75, that is, a portion on the side of the illumination range k, and the indirect emitting portion 78 covers a portion on the left of the substrate 75, that is, a portion on the side of the reflecting plate 73.

Furthermore, the indirect emitting portion 78 includes a stepped portion 78a on its inner side, and this stepped portion 78a abuts against an end portion of the substrate 75, such that the indirect emitting portion 78 is supported by the substrate 75 in a fixed manner. The left end side of the direct emitting portion 77 is linked to the indirect emitting portion 78, a leg portions 77b at a right end 77a is mounted and fixed on the substrate 75, and the direct emitting portion 77 is supported by the substrate 75 in a fixed manner.

The inner faces (the light incident faces facing the LED array 71) of the direct emitting portion 77 and the indirect emitting portion 78 are flat faces. The light incident faces of the direct emitting portion 77 and the indirect emitting portion 78 are arranged at mutually different positions around the LED array 71, and the LED array 71 is disposed on the side of an inner angle defined by these light incident faces. Here, the inner angle is an angle of less than 180° formed by the light incident faces.

Furthermore, the outer faces (the light emission faces facing the illumination range k and the reflecting plate 73) of the direct emitting portion 77 and the indirect emitting portion 78 are convex faces. The outer convex faces of the direct emitting portion 77 and the indirect emitting portion 78 are formed so as to condense light transmitted through the direct emitting portion 77 and light transmitted through the indirect emitting portion 78 and reflected by the reflecting plate 73 onto the illumination range k.

In addition, a light diffusing portion 70 is provided on an outer face (convex face) of the direct emitting portion 77. For example, in the case where the light-guiding member 72 is a molded item of polycarbonate having light transmission properties, the light diffusing portion 70 is formed by molding the convex face of the direct emitting portion 77 to be a roughened surface. More specifically, an asperity is etched into a portion on the inner side of the mold of the light-guiding member 72, the portion corresponding to the convex face of the direct emitting portion 77, and the convex face of the direct emitting portion 77 is roughened by the asperity in the portion on the inner side of the mold during molding, thereby forming the light diffusing portion 70. Alternatively, an asperity on the inner side portion of the mold can be formed by sandblasting, in which iron powder or glass powder is blasted onto the inner side portion. The dimension of the asperity can be adjusted by changing the diameter or the blasting pressure of the iron powder or glass powder, and the width and the depth of the asperity are set to 0.5 μm to 10 μm, approximately.

Alternatively, the convex face of the direct emitting portion 77 may be formed as a smooth face by the mold, and the convex smooth face may be thereafter roughened by sandblasting.

Alternatively, the convex face of the direct emitting portion 77 may be formed as a smooth face by the mold, and a coat of paint having light dispersion properties may be applied to the convex face so as to provide the light diffusing portion 70. Favorable examples of the paint include paints that contain silica, barium sulfate, calcium carbonate, titanium white, glass beads, resin beads or the like for diffusing light, in a volatile solvent.

Furthermore, instead of providing the light diffusing portion 70 on the convex face of the direct emitting portion 77, particles or powders having light dispersion properties may be dispersed in the direct emitting portion 77. Such particles or powders having light dispersion properties can be dispersed by mixing such particles or powders into a molten resin serving as the material for the direct emitting portion 77 before molding the direct emitting portion 77.

Furthermore, in the illuminating device 51, a slit St in the main-scanning direction X is formed between the LED array 71 and the reflecting plate 73. The illumination range k is set directly above the slit St, and the first reflecting mirror 52 is positioned directly below the slit St. The light-guiding member 72 is provided on the side of the LED array 71 with respect to the slit St.

A light emission face 76a of each LED 76 of the LED array 71 faces the reflecting plate 73, and the optical axes of the LEDs 76 point to the left (to the left in FIG. 3, that is, in Y axis direction). The light emission range of each LED 76 is up to approximately 90° in every direction from the optical axis of the LED 76 centered about this optical axis. Furthermore, the surface of the substrate 75 is white, and light emitted from each LED 76 is reflected by the surface of the substrate 75. Accordingly, almost all of the light from each LED 76 is emitted in a range a having an angle of 90° defined by the surface of the substrate 75 and a perpendicular plane perpendicular to the surface of the substrate 75 that passes through the LED 76.

Furthermore, the reflecting plate 73 has a first reflecting face 73a and a second reflecting face 73b. The first reflecting face 73a and the second reflecting face 73b are inclined upward such that light emitted from the LED array 71 can be reflected toward the illumination range k. Furthermore, the second reflecting face 73b is slightly bent with respect to the first reflecting face 73a, and the orientation of the second reflecting face 73b is changed.

Furthermore, the first reflecting mirror 52 is disposed so as to be parallel to the main-scanning direction X and inclined at 45° with respect to the scanning face (the surface of the platen glass 44 and the document-reading glass 65).

Figure 5:
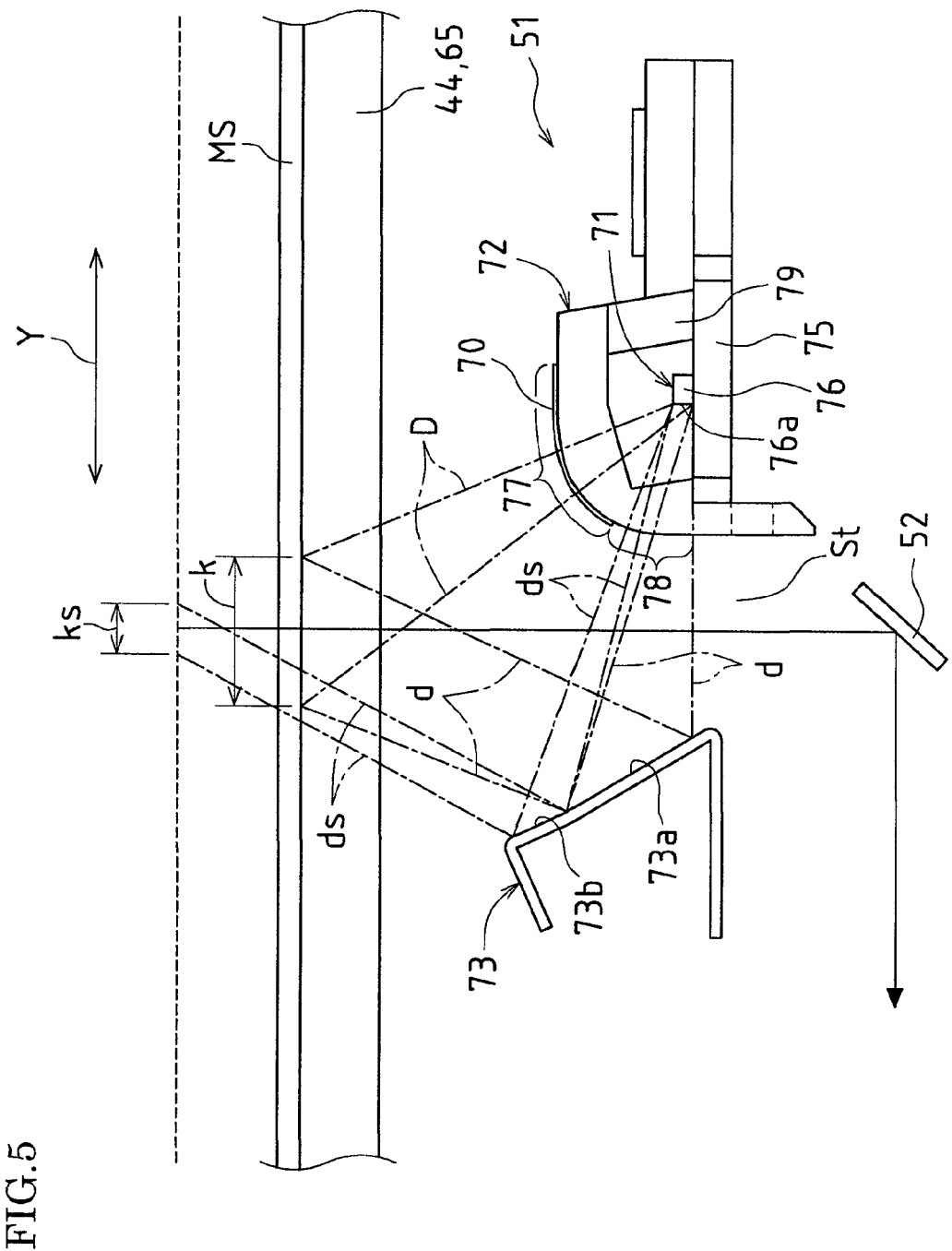
FIG. 5 is a cross-sectional view showing an illuminated state by the illuminating device of the first scanning unit of FIG. 3.

In the thus configured illuminating device 51, as shown in FIG. 5, when the LED array 71 on the substrate 75 emits light, the light emitted from the LED array 71 is incident on the light incident face of the direct emitting portion 77 of the light-guiding member 72, transmitted through the direct emitting portion 77, condensed by the outer convex face of the direct emitting portion 77 and diffused by the light diffusing portion 70 having a convex face, and irradiated on the illumination range k centered about the document reading reference position on the surface of the platen glass 44 and the document-reading glass 65.

Taking an optical path from the LED array 71 via the direct emitting portion 77 to the illumination range k as a first optical path D, this first optical path D is the shortest straight optical path from the LED array 71 to the illumination range k, and the light via the first optical path D illuminates the illumination range k.

Furthermore, the light emitted from the LED array 71 is incident on the light incident face of the indirect emitting portion 78 of the light-guiding member 72, transmitted through the indirect emitting portion 78, condensed by the outer convex face of the indirect emitting portion 78, incident on the first reflecting face 73a of the reflecting plate 73, reflected by the first reflecting face 73a, and incident on the illumination range k.

Taking an optical path from the LED array 71 via the indirect emitting portion 78 and then the first reflecting face 73a to the illumination range k as a second optical path d, this second optical path d is an optical path that is bent at the first reflecting face 73a and longer than the first optical path D. The light via the second optical path d also illuminates the illumination range k.

Furthermore, when light emitted from the LED array 71 is transmitted through the indirect emitting portion 78 of the light-guiding member 72, condensed by the outer convex face of the indirect emitting portion 78, and incident on the second reflecting face 73b of the reflecting plate 73, the light is reflected by the second reflecting face 73b, and incident on an illumination range ks at a position 5 mm higher than the surface of the platen glass 44 and the document-reading glass 65.

Taking an optical path from the LED array 71 via the indirect emitting portion 78 and then the second reflecting face 73b to the illumination range k as an auxiliary optical path ds, this auxiliary optical path ds is also an optical path that is bent at the second reflecting face 73b and longer than the first optical path D. Light via the auxiliary optical path ds illuminates the illumination range ks at a position 5 mm higher than the surface of the document-reading glass 65. The illumination range ks at the position 5 mm higher than the surface of the document-reading glass 65 is set by slightly bending the second reflecting face 73b with respect to the first reflecting face 73a as described above.

Accordingly, the illumination range k centered about the document reading reference position on the surface of the platen glass 44 and the document-reading glass 65 is illuminated with light in the straight first optical path D transmitted through the direct emitting portion 77, and is illuminated with light in the second optical path d transmitted through the indirect emitting portion 78 and reflected by the first reflecting face 73a of the reflecting plate 73. Accordingly, the surface of the document MS is illuminated with a large amount of light.

Figure 6:
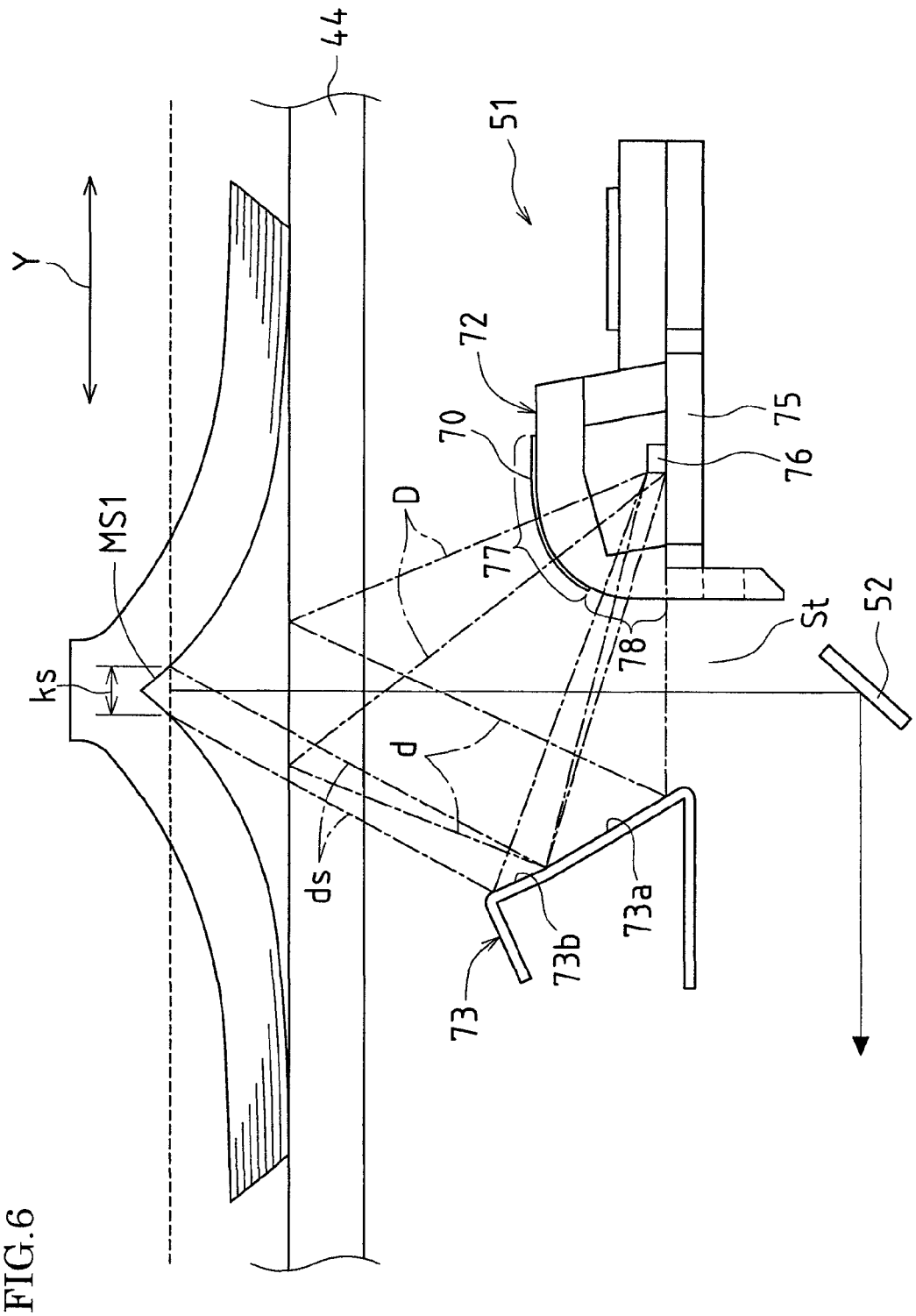
FIG. 6 is a diagram showing a state in which a book is illuminated.

Also, the illumination range ks at a position 5 mm higher than the surface of the platen glass 44 and the document-reading glass 65 is illuminated with light in the auxiliary optical path ds transmitted through the indirect emitting portion 78 and reflected by the second reflecting face 73b of the reflecting plate 73. Accordingly, even when the surface of the document is lifted from the surface of the platen glass 44 and the document-reading glass 65, this surface is illuminated. For example, as shown in FIG. 6, in a state where a book is opened and placed on the platen glass 44, the pages are lifted from the platen glass 44 at a portion MS1 where the book is bound. Here, light in the auxiliary optical path ds reaches the lifted pages, and illuminates the lifted pages.

Figure 7:
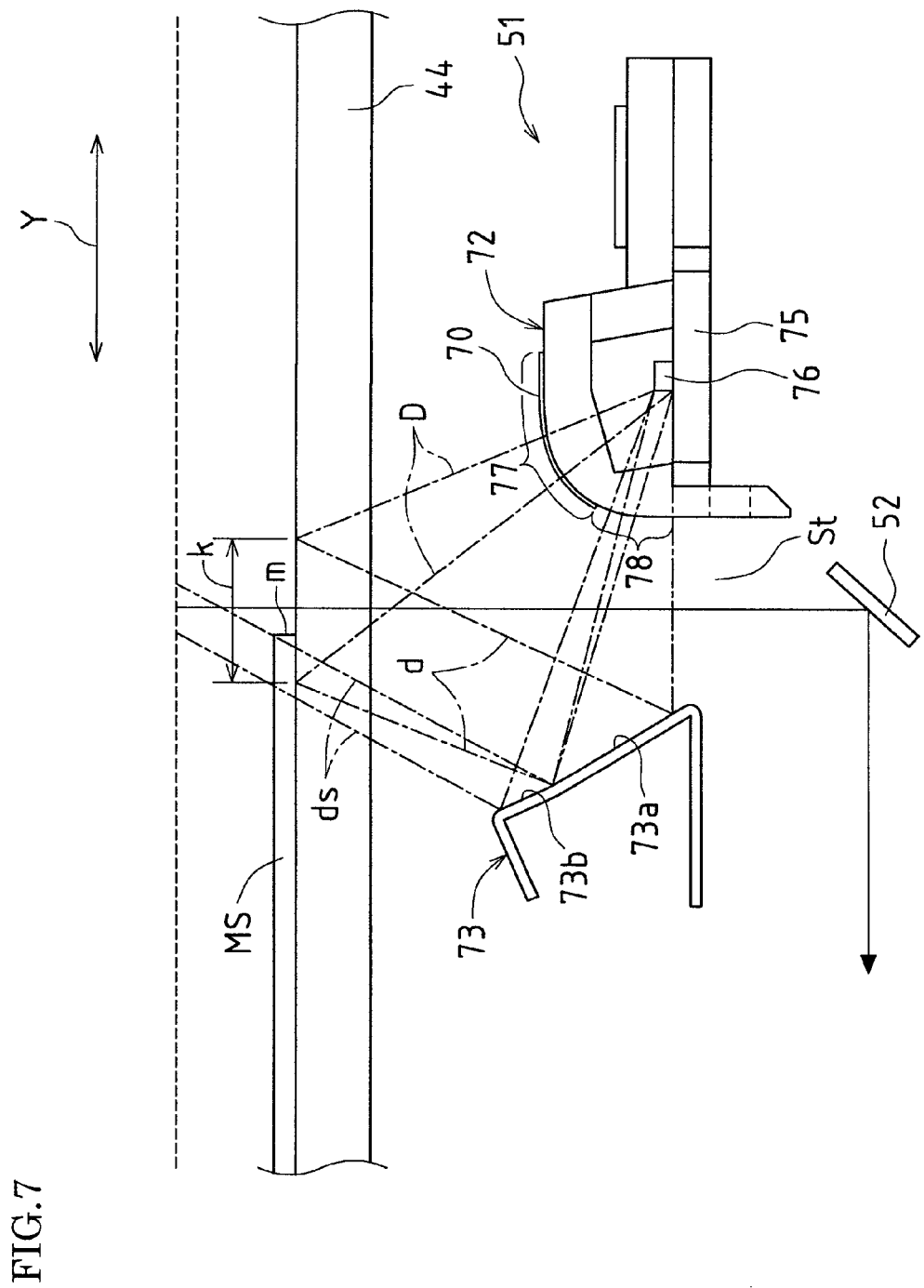
FIG. 7 is a diagram showing a state in which a trailing edge portion of a document is illuminated.

Furthermore, the direction in which light transmitted through the direct emitting portion 77 is incident on the illumination range k is different from the direction in which light reflected by the reflecting plate 73 is incident on the illumination range k. Accordingly, for example, as shown in FIG. 7, even in a state where a trailing edge portion m of the document MS is positioned in the illumination range k, and light reflected by the first reflecting face 73a of the reflecting plate 73 is incident on the trailing edge portion m of the document MS, forming the shadow of the trailing edge portion m, the shadow disappears due to light transmitted through the direct emitting portion 77 being incident the trailing edge portion m. That is to say, the trailing edge portion m of the document MS is irradiated with illuminating light from the front and light from the rear, and, thus, the shadow of the trailing edge portion m of the document MS is not formed, and no shadow is formed on an image of a document read by the CCD 48.

As shown in FIGS. 3 and 4, the direct emitting portion 77 covers a portion obliquely above the LED array 71, and the indirect emitting portion 78 covers a portion on the left of the LED array 71, so almost all of the light emitted from the LED array 71 in a range a having an angle of 90° is irradiated onto the illumination range k via the first optical path D and the second optical path d. Thus the light loss is kept low.

In addition, since the surface of the substrate 75 is a white surface, light reflected by the surface of the substrate 75 is incident on the illumination range k via the first optical path D and the second optical path d, which also keeps the light loss low.

Light emitted from the LED array 71 is irradiated onto the document MS or a page of a book on the platen glass 44 or the document-reading glass 65 via the light-guiding member 72 or the light-reflecting plate 73. Then, reflected light from the document MS or the page of the book passes through the slit St, and is reflected by the first reflecting mirror 52. The reflected light is emitted toward the second reflecting mirror 53 of the second scanning unit 46 through an opening portion on the side wall of the moving scanning frame 74.

Here, the direct emitting portion 77 condenses light incident on the inner flat face of the direct emitting portion 77 and causes the light to be incident on the illumination range k, and therefore, as the area of the inner flat face of the direct emitting portion 77 increases, the amount of light irradiated on the illumination range k from the direct emitting portion 77, that is, the irradiation light amount from the first optical path D, increases.

Similarly, the indirect emitting portion 78 condenses light incident on the inner flat face of the indirect emitting portion 78 and causes the light to be incident on the illumination range k, and therefore, as the area of the inner flat face of the indirect emitting portion 78 increases, the amount of light irradiated on the illumination range k from the indirect emitting portion 78, that is, the irradiation light amount from the second optical path d, increases.

Accordingly, by appropriately setting the area of the inner flat face of the direct emitting portion 77 and the area of the inner flat face of the indirect emitting portion 78, the ratio between the irradiation light amount from the first optical path D and the irradiation light amount from the second optical path d can be adjusted.

Specifically, by setting the area of the indirect emitting portion 78 interposed between the LED array 71 and the light-reflecting plate 73 to be smaller than the area of the direct emitting portion 77, the ratio between the irradiation light amount from the second optical path d and the irradiation light amount from the first optical path D can be set to, for example, 4:6, approximately. Also as described above, in order to irradiate the trailing edge portion m of the document MS with irradiation light from the front and light from the rear so as not to form the shadow of the trailing edge portion m of the document MS, it is preferable to set the ratio between the irradiation light amount from the second optical path d and the irradiation light amount from the first optical path D to approximately 4.5:5.5.

Next, the light diffusing portion 70 in the outer face (convex face) of the direct emitting portion 77 will be described in detail. The light diffusing portion 70 appropriately diffuses light in the first optical path D as described above, and causes the diffused light to be incident on the illumination range k centered about the document reading reference position on the surface of the platen glass 44 and the document-reading glass 65, and reduces uneven illumination on the document MS.

First, since the ratio between the irradiation light amount from the second optical path d and the irradiation light amount from the first optical path D is set to 4:6 to 5:5, it is possible to say that the light diffusing portion 70 in the convex face of the direct emitting portion 77 is provided in the optical path, of the first optical path D and the second optical path d, that has a larger irradiation light amount.

The reason for this is as follows. With illumination via the first optical path D having the larger irradiation light amount, the bright spots of the LEDs 76 are readily reflected by the document MS, which aggravates uneven illumination, so the light in the first optical path D is diffused by the light diffusing portion 70 so as to eradicate the bright spots of the LEDs 76 on the document MS. Also, with illumination via the second optical path d having a smaller irradiation light amount, the bright spots of the LEDs 76 are hardly reflected by the document MS, so that no light diffusing portion is provided so as not to increase the light loss.

Here, the relation between the irradiation light amount from the LEDs 76 to the document MS and uneven illumination will be explained.

Figure 8:
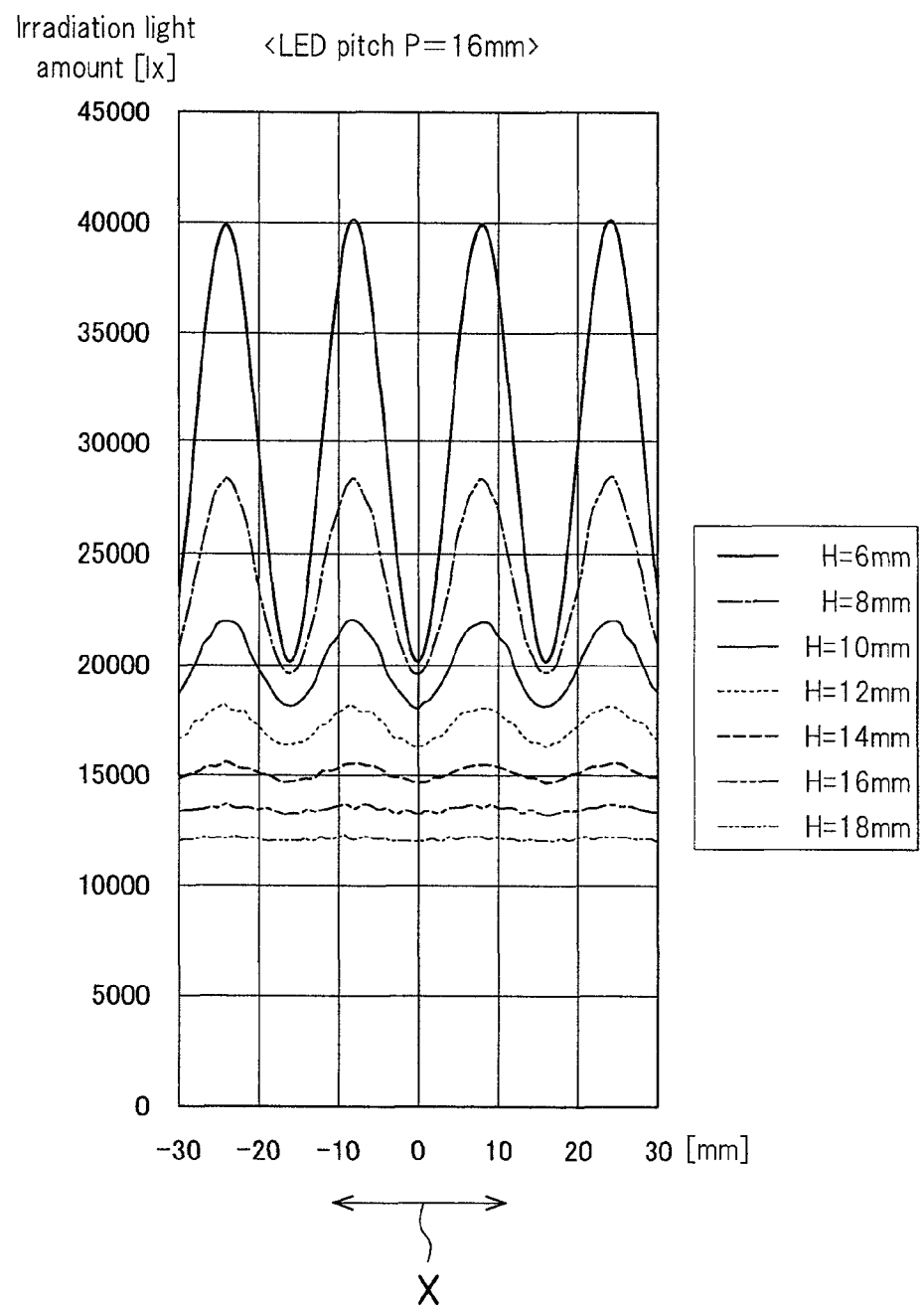
FIG. 8 is a graph illustrating a result of analyzing the correspondence between the distance of an optical path from an LED array to a document and the irradiation light amount on the document, using analysis simulation software.

FIG. 8 is a graph showing a result of analyzing the correspondence between the distance of the optical path from the LEDs 76 to the document MS and the irradiation light amount on the document MS using analysis simulation software. In the simulation using this analysis simulation software (Light Tools manufactured by Optical Research Associates), a virtual image-reading apparatus 100 is configured on the computer, the distance of the optical path from the LEDs 76 to the document MS placed on the surface of the platen glass 44 and the document-reading glass 65 (the optical axis of the LED 76) H is varied in increments of 2 mm in a range of 6 mm to 18 mm, and the distribution in the main scanning direction X of the irradiation light amount on the document MS is obtained for each optical axis distance H varied in increments of 2 mm. That is, the optical axis distance H from the LEDs 76 to the document MS is varied in increments of 2 mm so as to vary the irradiation light amount on the document MS, and the distribution in the main scanning direction X of the irradiation light amount on the document MS is obtained for each optical axis distance H.

Note that the pitch P of the LEDs 76 is set to 16 mm. Also, the light flux of the LED 76 is 7.81 [lm (lumen)] (a luminosity of 1900 [mcd (milicandela)]).

In the graph in FIG. 8, characteristic curves G1 to G7 each indicating distribution of the irradiation light amount in the main scanning direction X are shown for the respective optical axis distances H obtained by varying the optical axis distance H in increments of 2 mm. As clearly understood by comparing these characteristic curves G1 to G7 with each other, as the optical axis distance H becomes shorter, the irradiation light amount on the document MS increases.

Also, as the optical axis distance H becomes shorter, that is, as the irradiation light amount on the document MS increases, the irradiation light amount on the document MS fluctuates more greatly. The fluctuation cycle of the irradiation light amount matches the pitch P of the LEDs 76, and the irradiation light amount becomes maximal on the optical axes of the LEDs 76 and becomes minimal at the midpoints between adjacent LEDs 76.

In the case where the optical axis distance H is short and the irradiation light amount on the document MS is large, so that the irradiation light amount greatly fluctuates, the bright spots of the LEDs 76 are reflected by the surface of the document MS in the positions where the optical axes of the LEDs 76 intersect the surface of the document MS, and uneven illumination is aggravated.

Note that instead of varying the optical axis distance H, also by varying the emitted light amount of the LEDs 76 while maintaining the optical axis distance H at a fixed value, the irradiation light amount fluctuates. That is, as the emitted light amount of the LEDs 76 increases, the irradiation light amount on the document MS increases, and the fluctuation of the irradiation light amount on the document MS becomes greater. As a result, the bright spots of the LEDs 76 are reflected by the surface of the document MS in the positions where the optical axes of the LEDs 76 intersect the surface of the document MS.

In this manner, uneven illumination occurs on the document MS illuminated by the LEDs 76, and therefore it is preferable to clarify the acceptable limit of the uneven illumination. Therefore, the uneven illumination was subjected to the following evaluation.

Figure 9:
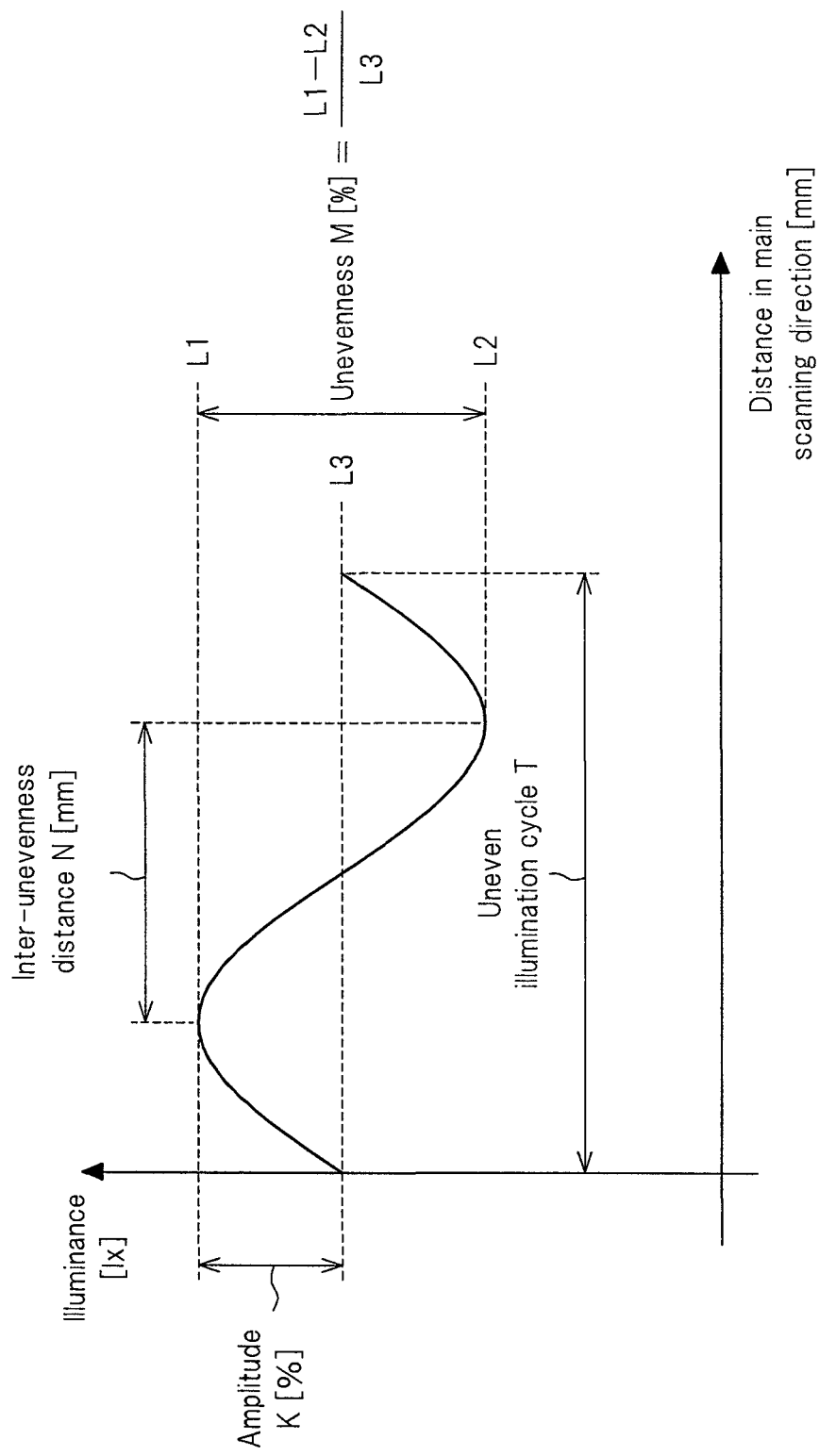
FIG. 9 is a graph used for defining uneven illumination.

First, with reference to FIG. 9, uneven illumination is defined. On the document MS illuminated by the LEDs 76, dark and light conditions are alternately repeated in the uneven illumination cycle T in the main scanning direction X.

The uneven illumination cycle T is the same as the LED pitch P. The unevenness of illumination M [%] is expressed as (L1-L2)/L3(%), where L1 [lx (lux)] is the maximum value of the irradiation light amount, L2 [lx (lux)] is the minimum value of the irradiation light amount, and L3 [lx (lux)] is the average value of the irradiation light amounts. The inter-unevenness distance N [mm] represents the interval between the maximum value and the minimum value of the irradiation light amount in the uneven illumination cycle T, and corresponds to half of the pitch P (mm). Furthermore, the amplitude K [%] is (L1-L3)/L3 (%).

In the evaluation of the uneven illumination, 31 patterns of images were created by varying the values of the uneven illumination cycle T and the amplitude K [%] shown in FIG. 9, and evaluated. The images were created by a personal computer, and printed with a printer. The color tone of the printed image was set to gray. Various printed images created as above were checked visually by a large number of test subjects, and a determination was made as to whether the uneven density (uneven density corresponding to uneven illumination) on the printed image is acceptable. More specifically, with the use of a gray chart having the same tone as the images, a sample of an acceptable limit of uneven density (uneven illumination) and a sample of a limit of sufficiently-acceptable uneven density (uneven illumination) were prepared, and the images are checked visually by a large number of test subjects. The results are shown in FIGS. 10 and 11.

FIG. 10 is a chart showing the uneven illumination cycle T, amplitude K [%], inter-unevenness distance N [mm] and unevenness M [%] calculated from these values, and determination results of the printed image. FIG. 11 is a graph prepared based on the values in FIG. 10, in which the vertical axis marks the unevenness M [%] and the horizontal axis marks the inter-unevenness distance N [mm].

Figure 11:
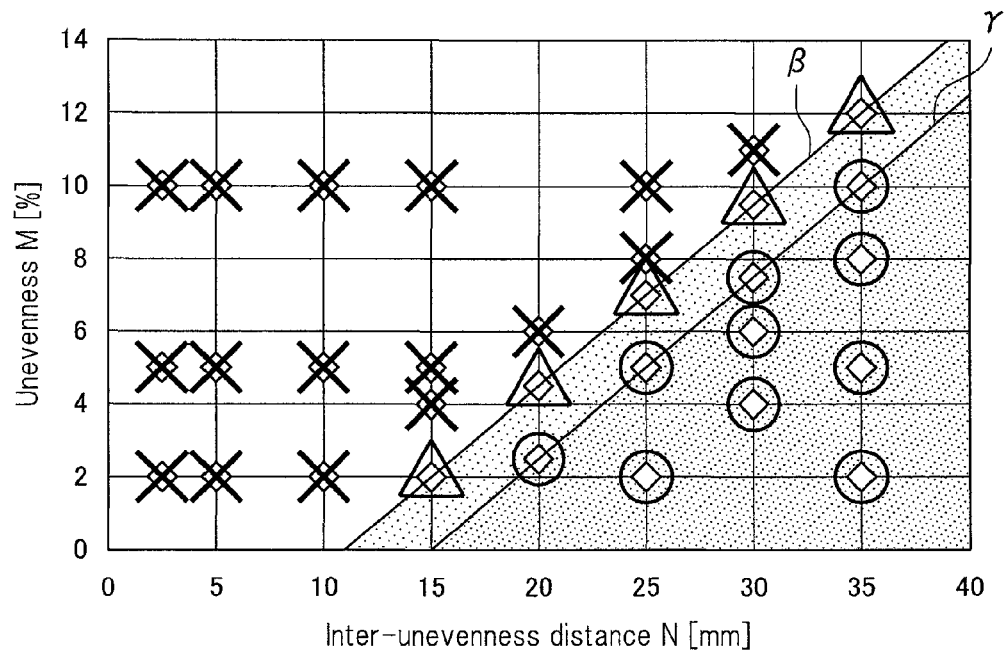
FIG. 11 is a graph showing the optical axis distance H and the illumination unevenness M, correlated to each other.

Note that in the determination column in FIG. 10 and the graph in FIG. 11, "○" means "uneven density (uneven illumination) is sufficiently acceptable", "Δ" means "uneven density (uneven illumination) is at the acceptable limit", and "x" means "uneven density (uneven illumination) is not acceptable".

As shown in FIG. 11, the determination that uneven density (uneven illumination) is not acceptable (determined as "x") was made in the range of N/2-5.5 (see β in FIG. 11)<M, the determination that uneven density (uneven illumination) is at the acceptable limit (determined as "Δ") was made in the range of N/2-7.5 (see y in FIGS. 11)<M<N/2-5.5 (see light dotted portion in FIG. 11), and the determination that uneven density (uneven illumination) is sufficiently acceptable (determined as "○") was made in the range of M<N/2-7.5 (see dark dotted portion in FIG. 11).

Next, an analysis simulation in which the unevenness M [%] and the inter-unevenness distance N [mm] are analyzed to specify the range of the (LED pitch P)/(optical axis distance H) will be described.

In an analysis simulation, a virtual image-reading apparatus was realized on the computer using an analysis simulation software (Light Tools manufactured by Optical Research Associates), and the unevenness M [%] and the inter-unevenness distance N [mm] were analyzed while varying the values of the LED pitch P (4 mm to 24 mm) and the optical axis distance H (4 mm to 19 mm). The value of P/H was determined based on the determination criteria shown in FIG. 11 with respect to the unevenness M [%] and the inter-unevenness distance N [mm] thus analyzed.

Note that when several example values of the LED pitch P and the optical axis distance H used in the analysis simulation were set in a real image-reading apparatus for verification, the unevenness M [%] and the inter-unevenness distance N [mm] obtained with the real image-reading apparatus were almost the same as those obtained in the analysis simulation.

Based on this, it was confirmed that the virtual image-reading apparatus realized on the computer using the analysis simulation software is almost equivalent to the real image-reading apparatus.

Figure 12:
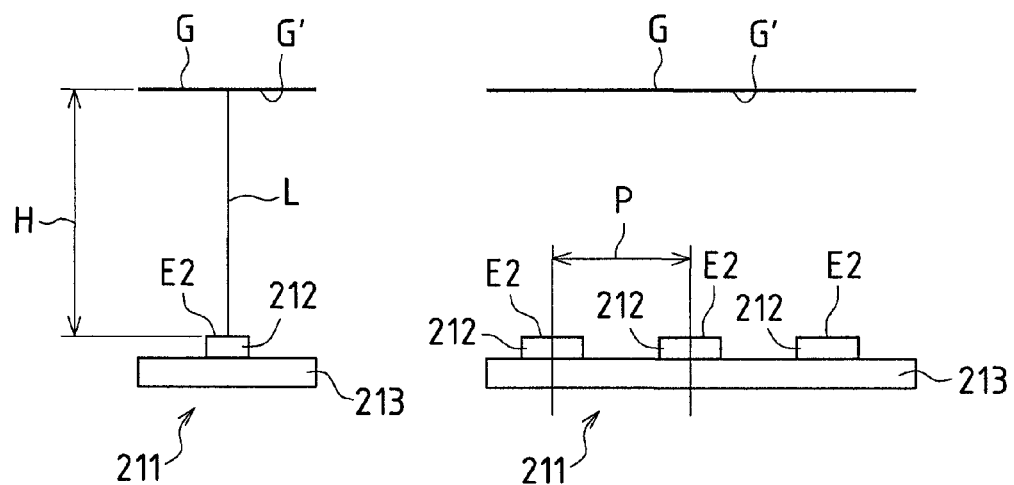
FIG. 12 is a diagram illustrating the conditions of an analysis simulation.

FIG. 12 is a diagram illustrating the conditions of the analysis simulation. In the analysis simulation, as shown in FIG. 12, a light source 211 was configured such that 20 LED elements 212, each including a light-emitting face E2 that performs top-face light emission, are arranged in a line, and are disposed such that their optical axis L is perpendicular to an irradiated face G' of a document G. Also, the light flux of a single LED element 212 (one LED element 212) was set to 7.81 [lm (lumen)] (a luminosity of 1900 [mcd (milicandela)]).

Figures 13A, 13B:
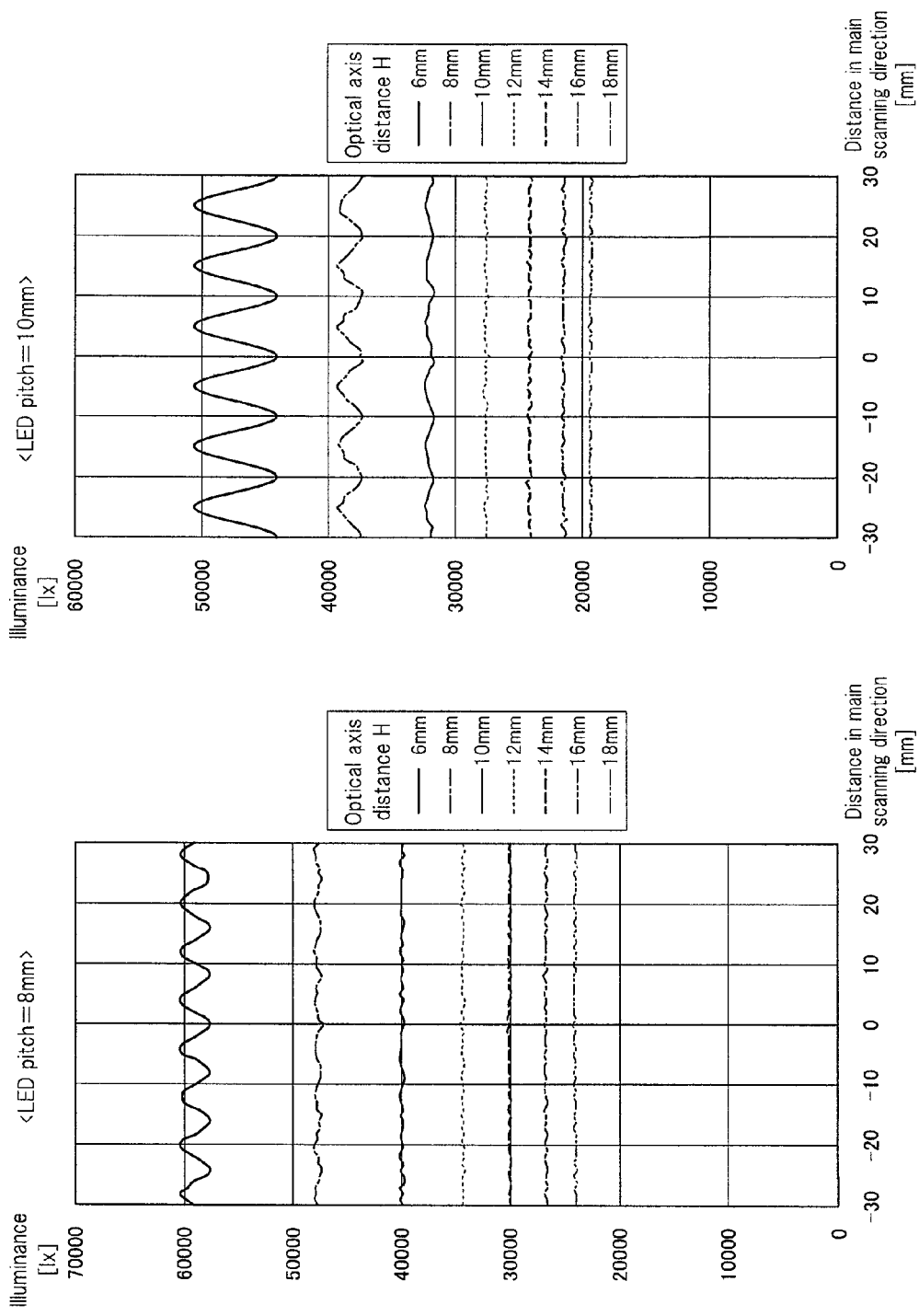
FIGS. 13A and 13B show graphs of the LED pitches of 8 mm and 10 mm, respectively.
Figures 15A, 15B:
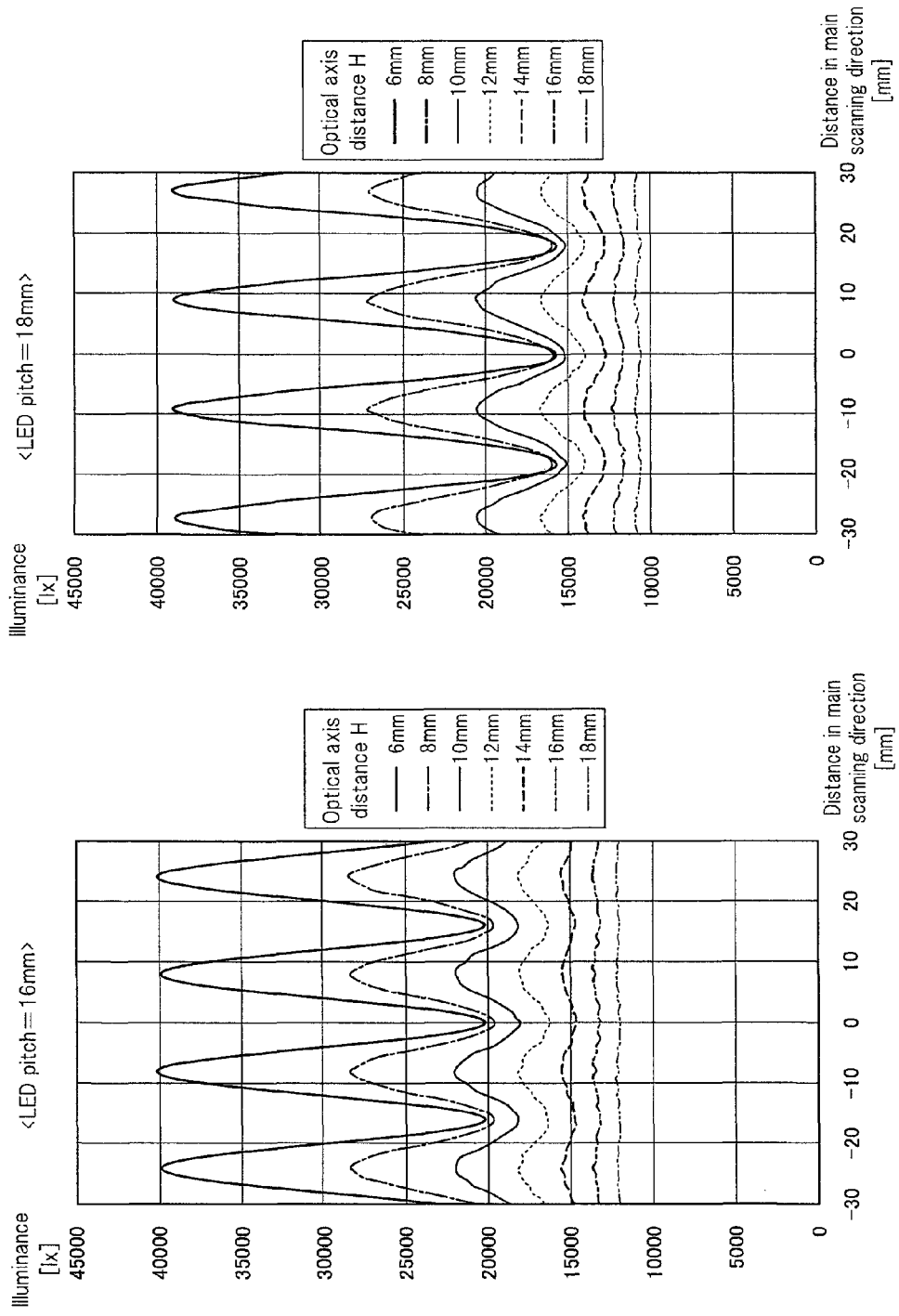
FIGS. 15A and FIG. 15B show graphs of the LED pitches of 16 mm and 18 mm, respectively.

FIGS. 13 to 15 show graphs, each illustrating, at one of the LED pitch values employed in the analysis simulation, the irradiation light amount [lx] on the irradiated face G' of the document G with respect to the distance in the main scanning direction [mm] at several values of the optical axis distance H. FIGS. 13A and 13B show graphs for the LED pitch P of 8 mm and 10 mm, respectively. FIGS. 14A and 14B show graphs for the LED pitch P of 12 mm and 14 mm, respectively, and FIGS. 15A and 15B show graphs for the LED pitch P of 16 mm and 18 mm, respectively. In each graph of FIGS. 13 to 15, the optical axis distance H is set to 6 mm, 8 mm, 10 mm, 12 mm, 14 mm, 16 mm and 18 mm as examples. Graphs of other optical axis distances H are not shown.

Among the graphs, the graph in FIG. 15A with the LED pitch P set to 16 mm is used to describe below an example of automatically determining the uneven illumination when the optical axis distance H is 6 mm.

Figure 16:
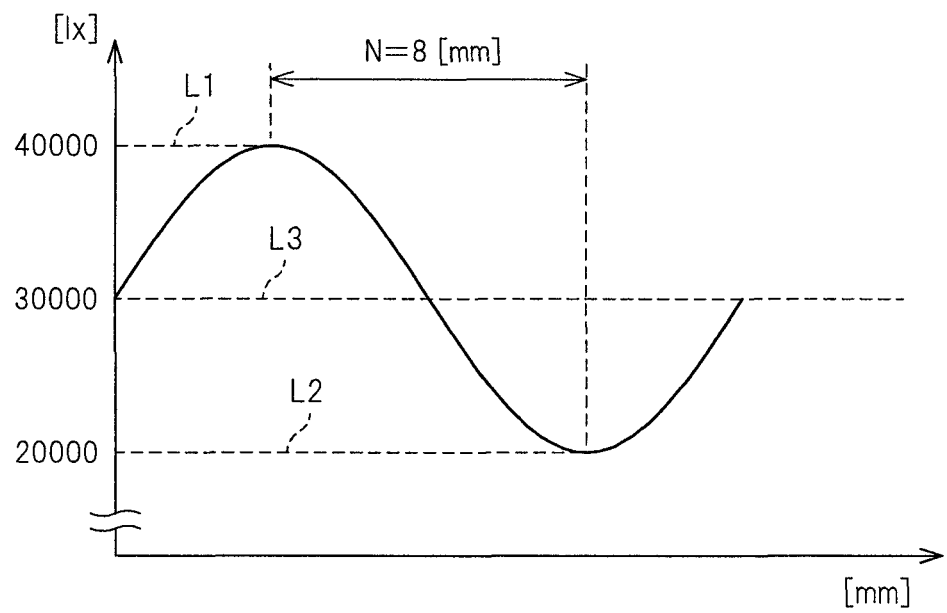
FIG. 16 is a diagram illustrating unevenness M [%] when a light-emitting element having a single-line configuration is used, with the LED pitch set to 16 mm and the optical axis distance set to 6 mm.

FIG. 16 is a diagram illustrating the unevenness M [%] in the case where the LED pitch P is 16 mm, the optical axis distance H is 6 mm and light-emitting elements arranged in a single line are used.

In the case where the LED pitch P is 16 mm and the optical axis distance H is 6 mm, it is understood from the graph in FIG. 16 that the maximum value L1 of the irradiation light amount on the irradiated face G' of the document G is 40000 [lx], the minimum value L2 is 20000 [lx], and the average value L3 is 30000 [lx]. When these values are assigned to the expression for obtaining the unevenness M [%], (L1-L2)/L3 described in FIG. 9, the unevenness M [%] is calculated to be 66.7 [%]. Also, since the LED pitch P is 16 mm, the inter-unevenness distance N [mm] is 8 mm.

When the unevenness M [%]=66.7 [%] and the inter-unevenness distance N [mm]=8 mm obtained in this manner are applied to the graph showing the relation between the unevenness M [%] and the inter-unevenness distance N [mm] as shown in FIG. 11, such values fall within the range of N/2-5.5 (see 6 in FIG. 11)<M. As a result, P/H (16 mm/6 mm=2.67) is determined to be unacceptable uneven illumination (determined as "x"). The tables in FIGS. 17 and 18 show the results of the determination similarly performed on other values of the LED pitch P and the optical axis distance H as well.

FIG. 17 shows the determination results of P/H in the case where the LED pitch P is varied from 4 mm to 11 mm in increments of 1 mm, and the optical axis distance H is varied from 4 mm to 24 mm in increments of 1 mm. FIG. 18 shows the determination results of P/H in the case where the LED pitch P is varied from 12 mm to 19 mm in increments of 1 mm, and the optical axis distance H is varied from 4 mm to 24 mm in increments of 1 mm.

As shown in FIGS. 17 and 18, when the relation of P/H>0.83 is satisfied, it is determined that the uneven illumination is not acceptable (determined as "x"), when the relation of 0.71<P/H≤0.83 is satisfied, it is determined that the uneven illumination is at the acceptable limit (determined as "Δ"), and when the relation of P/H≤0.71 is satisfied, it is determined that the uneven illumination is sufficiently acceptable (determined as "○").

Based on the above, it is understood that uneven illumination can be suppressed if the light-emitting element pitch P and the optical axis distance H satisfy the relation of P/H≤0.83. Thus, when the value of one of the light-emitting element pitch P and the optical axis distance H is known, the other can be easily set by setting the other such that the relation of M≤N/2-5.5 is satisfied, since it is sufficient to insert the light-emitting element pitch P or the optical axis distance H into the relational expression of P/H≤0.83 when setting the light-emitting element pitch P and the optical axis distance H. For example, when the optical axis distance H is obtained by inserting the light-emitting element pitch P into the relational expression, it is sufficient to set the optical axis distance H to the value of (P/0.83) or a value not less than and as close as possible to the value of (P/0.83), from the viewpoint of setting the largest-possible irradiation light amount on the irradiated face G' of the document G. On the other hand, when the light-emitting element pitch P is obtained by inserting the optical axis distance H into the relational expression, it is sufficient to set the light-emitting element pitch P to the value of (H×0.83) or a value not more than and as close as possible to the value of (H×0.83), from the viewpoint of setting the smallest-possible number of light-emitting elements.

In addition, it is understood that uneven illumination can be effectively prevented if the light-emitting element pitch P and the optical axis distance H satisfy the relation of P/H≤0.71. Thus, when the value of one of the light-emitting element pitch P and the optical axis distance H is known, the other can be easily set by setting the other such that the relation of M≤N/2-7.5 is satisfied, since it is sufficient to insert the light-emitting element pitch P or the optical axis distance H into the relational expression of P/H≤0.71 when setting the light-emitting element pitch P and the optical axis distance H. For example, when the optical axis distance H is obtained by assigning the light-emitting element pitch P to the relational expression, it is sufficient to set the optical axis distance H to the value of (P/0.71) or a value not less than and as close as possible to the value of (P/0.71), from the viewpoint of setting the largest-possible irradiation light amount on the irradiated face G' of the document G. On the other hand, when the light-emitting element pitch P is obtained by inserting the optical axis distance H into the relational expression, it is sufficient to set the light-emitting element pitch P to the value of (H×0.71) or a value not more than and as close as possible to the value of (H×0.71), from the viewpoint of setting the smallest-possible number of light-emitting elements.

Note that although a configuration in which light-emitting elements are arranged in a single line as shown in FIG. 12 is employed in the analysis simulation described above, any arrangement configuration of the light-emitting elements may be employed for the analysis simulation if such an arrangement configuration may generate the unevenness M [%] and the inter-unevenness distance N [mm].

Figure 29:
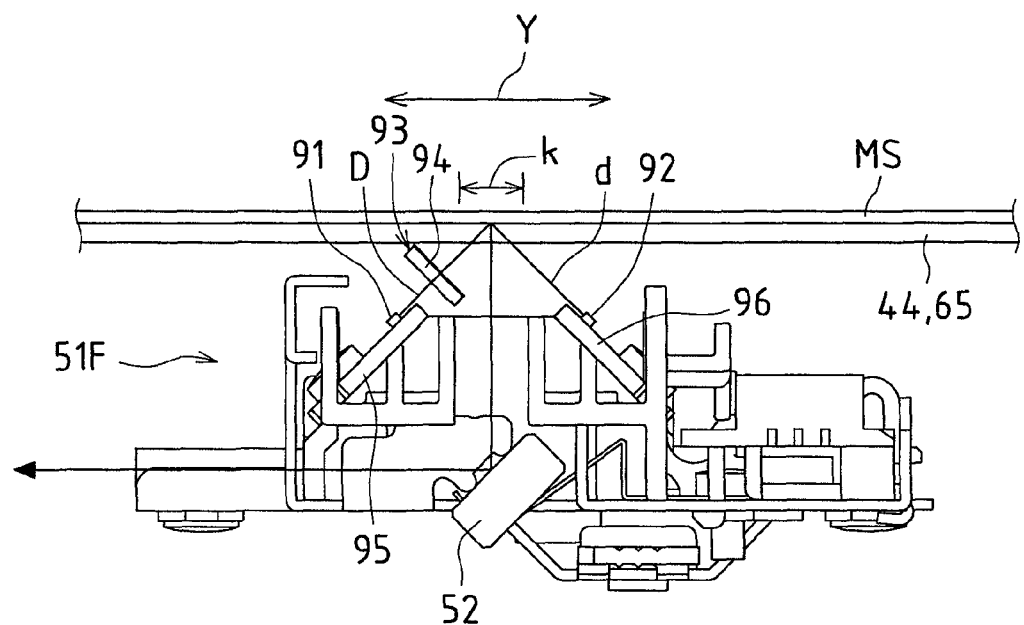
FIG. 29 is a cross-sectional view schematically illustrating an illuminating device of a seventh embodiment.
Figure 30:
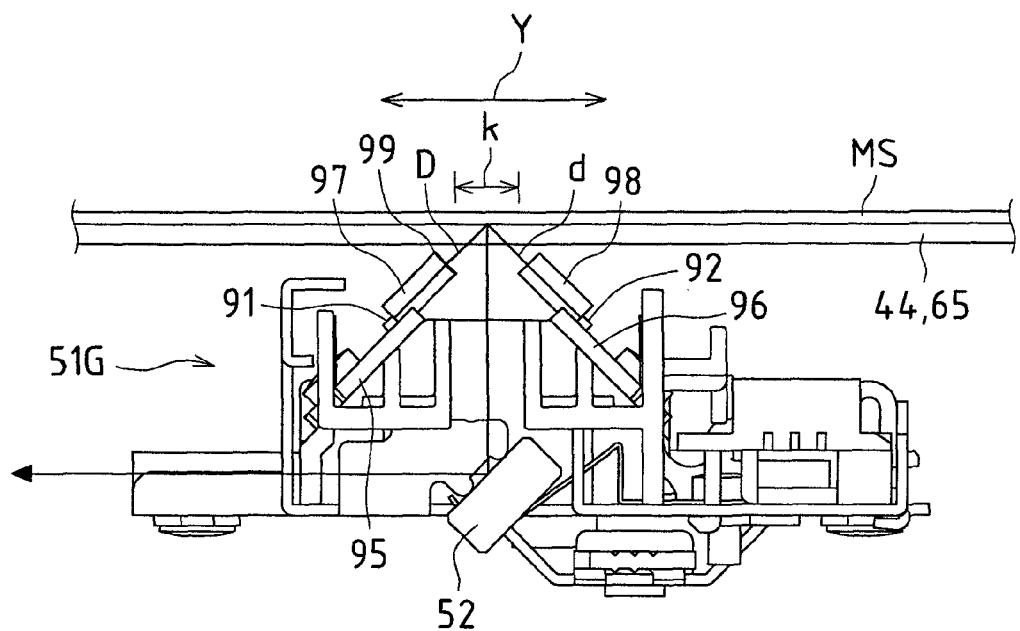
FIG. 30 is a cross-sectional view schematically illustrating an illuminating device of an eighth embodiment.

For example, also when the analysis simulation is performed on a configuration that includes first and second LED arrays 91 and 92 as shown in FIGS. 29 and 30, which will described in detail later, similar simulation results are obtained.

Figure 19:
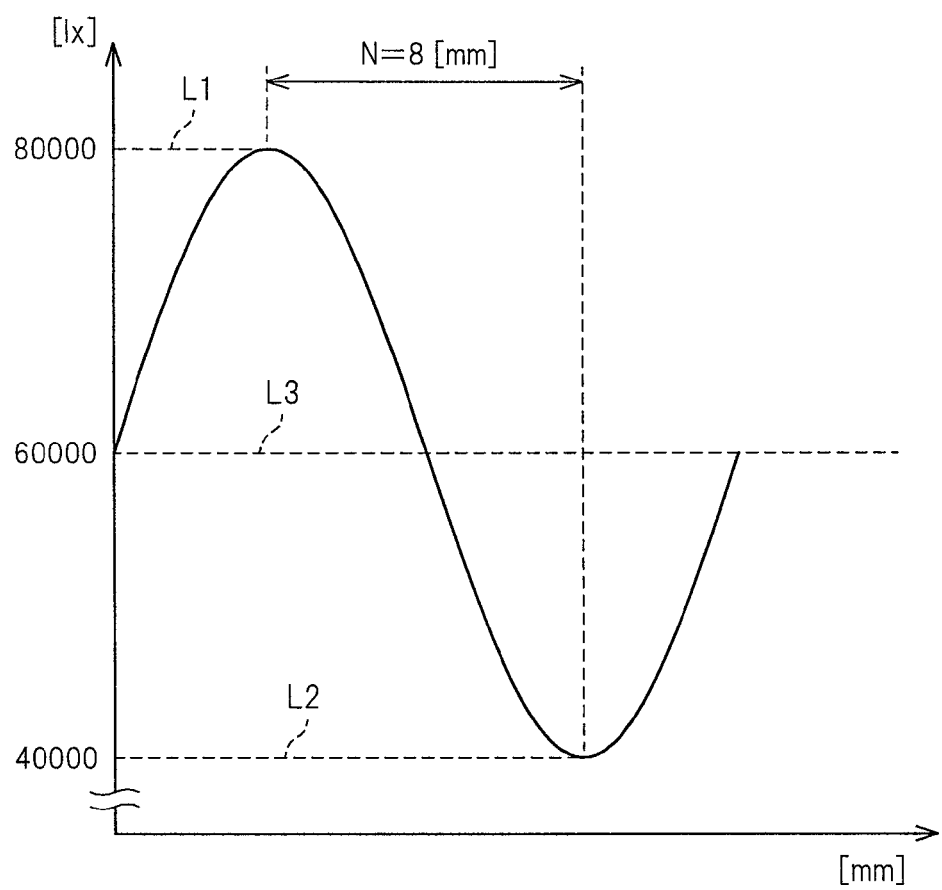
FIG. 19 is a diagram illustrating unevenness M [%] of the case where first and second LED arrays are used as shown in FIGS. 20 and 30, with the LED pitch set to 16 mm and the optical axis distance set to 6 mm.

FIG. 19 is a diagram illustrating the unevenness M [%] in the case where the LED pitch P is 16 mm, the optical axis distance H is 6 mm and first and second LED arrays 91 and 92 shown in FIGS. 29 and 30 are used.

In the first and the second LED arrays 91 and 92 shown in FIGS. 29 and FIG. 30, the positions and the pitch in which the LEDs are disposed are the same. With such a configuration as well, the maximum value L1 of the irradiation light amount on the irradiated face G' of the document G is 80000 [lx], the minimum value L2 is 40000 [lx], and the average value L3 is 60000 [lx]. When these values are assigned to the expression for obtaining the unevenness M [%] described in FIG. 9, (L1-L2)/L3, the unevenness M [%] is calculated to be 66.7 [%].

In this manner, a configuration in which the positions and the pitch in which the LEDs in the first and the second LED arrays 91 and 92 are disposed are the same can attain the same unevenness M [%] as that of a configuration in which the LEDs are arranged in a single line as shown in FIG. 12. Consequently, also when the analysis simulation is performed on the configuration in which the positions and the pitch in which the LEDs are disposed are the same, the same unevenness M [%] as that of the configuration in which the LEDs are arranged in a single line is obtained.

Also, in the analysis simulation, while the light flux of a single LED (one LED) is set to 7.81 [lm] (a luminosity of 1900 [mcd]), even if the light flux of a single LED was set to a larger or smaller value, the same unevenness M [%] was obtained due to the same reasons as described above.

In other words, regardless of the arrangement configuration or the light amount of the light-emitting element, if the relation of P/H≤0.83 is satisfied, uneven illumination can be suppressed to a degree acceptable for practical use. Furthermore, if the relation of P/H≤0.71 is satisfied, uneven illumination can be effectively prevented.

Incidentally, in the illuminating device 51 of the first embodiment, for example, the pitch P of the LEDs 76 is set to 16 mm. In this case as well, when the above condition, P/H≤0.83 or P/H≤0.71, is satisfied, it is possible to make the uneven illumination difficult to perceive.

Therefore, in the illuminating device 51, the optical axis distance H is set such that the above condition, P/H<0.83 or P/H<0.71, is satisfied with respect to the second optical path d. As a result, uneven illumination on the document MS due to light incident from the second optical path d does not occur.

However, taking into consideration that the irradiation light amount from the first optical path D is larger than the irradiation light amount from the second optical path d, and the ratio between the former irradiation light amount and the latter irradiation light amount is set to approximately 4:6 or that the optical axis distance H is short, if light emitted from the LED array 71 is directly incident on the document MS from the first optical path D, the irradiation light amount from the first optical path D greatly fluctuates, so that uneven illumination is readily perceived.

For example, as shown in FIG. 20A, the degree of fluctuation in the main scanning direction X of the irradiation light amount on the document MS from the second optical path d is small, and as shown in FIG. 20B, the degree of fluctuation in the main scanning direction X of the irradiation light amount on the document MS from the first optical path D is great In this case, as shown in FIG. 20C, the sum of the irradiation light amounts from the first optical path D and the second optical path d is incident on the document MS, so that uneven illumination is readily perceived.

However, in the first embodiment, since the light diffusing portion 70 is provided on the outer convex face of the direct emitting portion 77, light in the first optical path D is diffused by the light diffusing portion 70, and the diffused light in the first optical path D is incident on the document MS. For this reason, uneven illumination on the document MS due to light incident from the first optical path D does not occur.

Figure 21A:
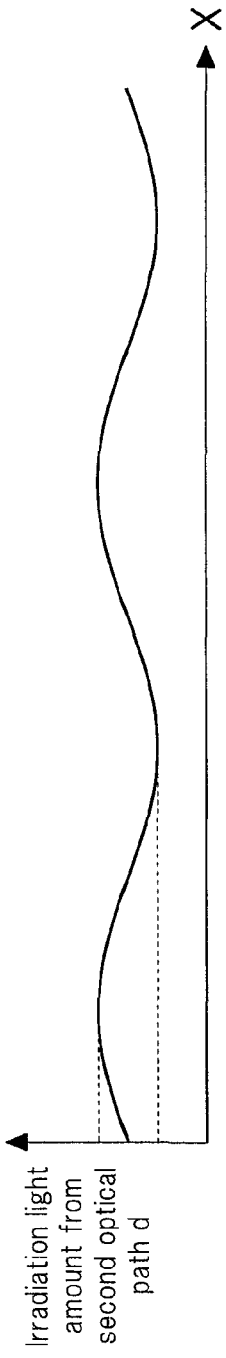
FIG. 21A shows the fluctuation in the main scanning direction X of the irradiation light amount from the second optical path.
Figure 21B:
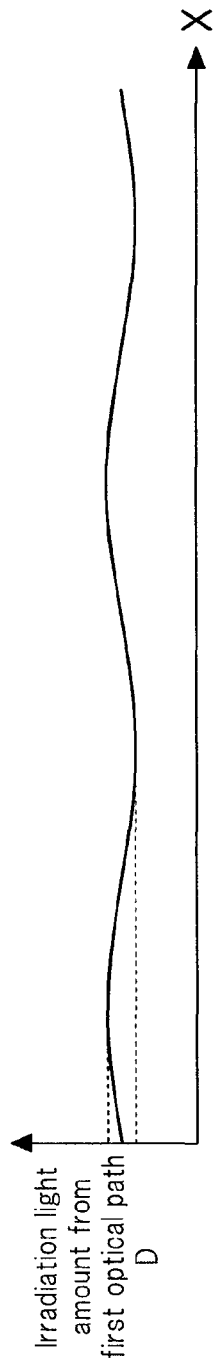
FIG. 21B shows the fluctuation in the main scanning direction X of the irradiation light amount when light emitted from the LED array is incident on the document via a light diffusing portion of the first optical path.

For example, as shown in FIG. 21A, the degree of fluctuation in the main scanning direction X of the irradiation light amount on the document MS from the second optical path d is small, and as shown in FIG. 21B, the degree of fluctuation in the main scanning direction X of the irradiation light amount on the document MS from the first optical path D is small.

Figure 21C:
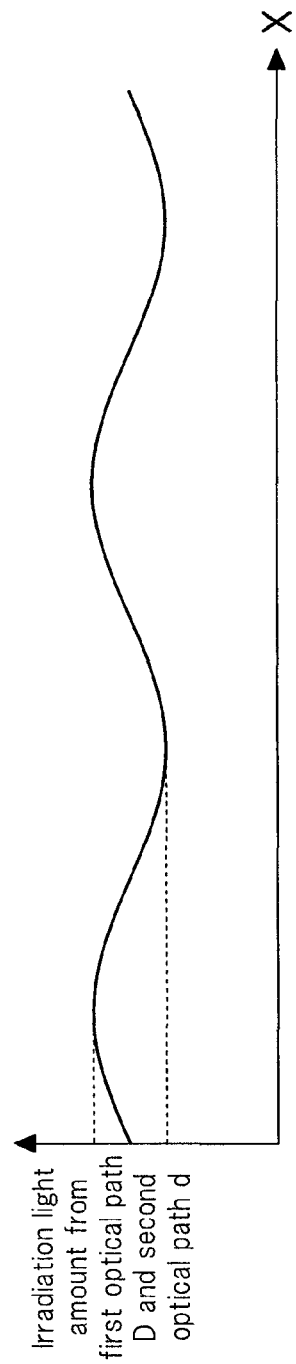
FIG. 21C shows the sum of the irradiation light amount in FIG. 21A and the irradiation light amount in FIG. 21B.

Accordingly, as shown in FIG. 21C, the degree of fluctuation of the sum of the irradiation light amounts from the first optical path D and the second optical path d is also small, so that uneven illumination is difficult to perceive.

That is, light in the first optical path D having a larger irradiation light amount is diffused by the light diffusing portion 70, and the diffused light in the first optical path D is caused to be incident on the document MS. Therefore the uneven illumination is reduced and the bright spots of the LEDs 76 are not reflected by the document MS.

Also, since light in the second optical path d having a smaller irradiation light amount causes little uneven illumination, a light diffusing portion is not provided in the second optical path d. Therefore, wasteful light loss is not increased.

Figure 22:
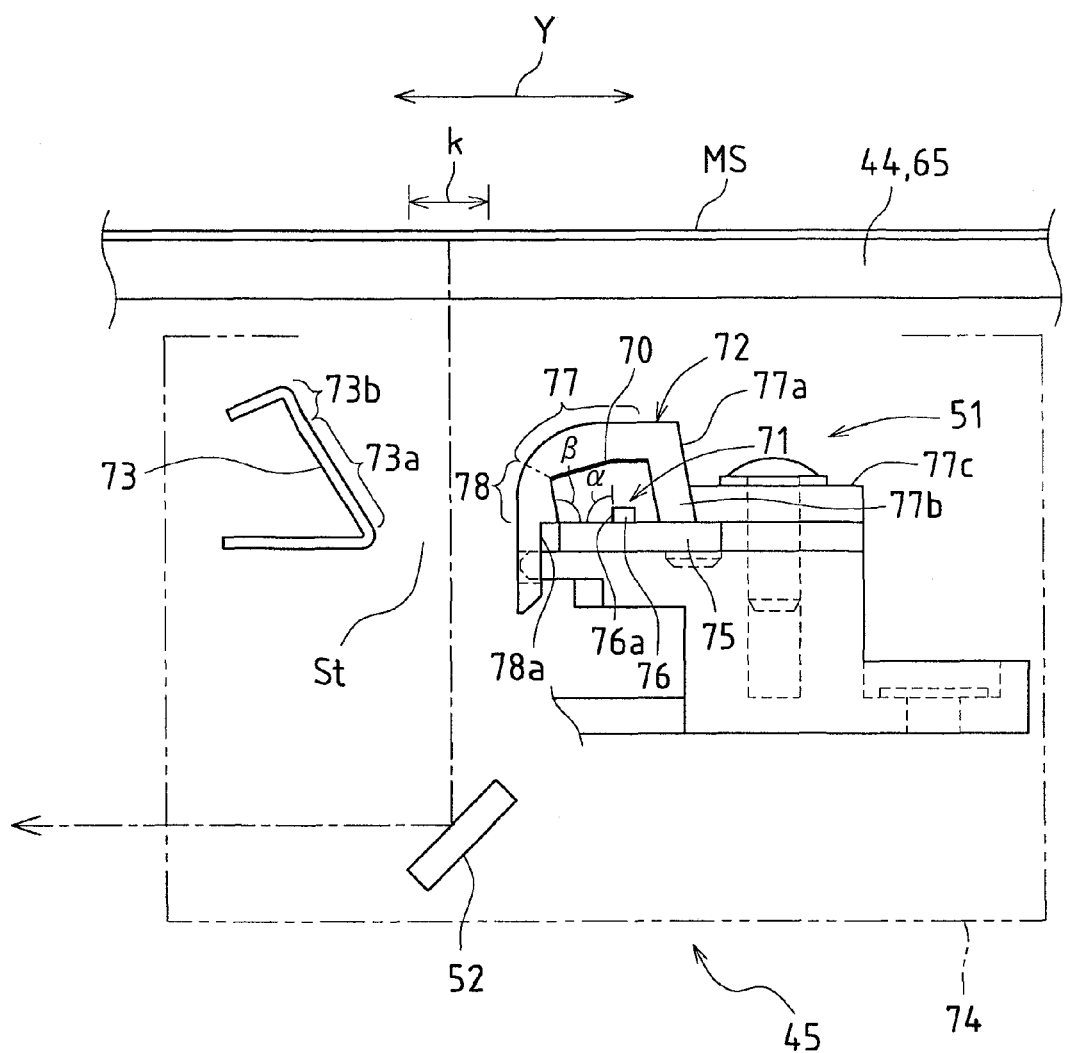
FIG. 22 is a cross-sectional view schematically illustrating a first modified example of the illuminating device of the first embodiment.

FIG. 22 is a cross-sectional view illustrating a first modified example of the illuminating device 51 of FIG. 3. In the first modified example, a light diffusing portion 70 is provided in an inner flat face of the direct emitting portion 77 of the light-guiding member 72.

In such a configuration as well, light in the first optical path D can be diffused by the light diffusing portion 70 in the inner flat face of the direct emitting portion, thereby reducing uneven illumination.

Also, when compared with the light diffusing portion 70 provided in the outer face (convex face) of the direct emitting portion 77 in FIG. 3, the light diffusing portion 70 of this modified example is provided in a position that is close to the LEDs 76 and far from the document MS. Therefore, when compared with light in the first optical path D in FIG. 3, light in the first optical path D that has passed through the light diffusing portion 70 is diffused over a wider area and incident on the document MS.

In contrast, the light diffusing portion 70 provided on the outer face (convex face) of the direct emitting portion 77 in FIG. 3 is provided in a position that is close to the document MS and far from the LEDs 76. Therefore, when compared with light in the first optical path D of this modified example, light in the first optical path D that has passed through the light diffusing portion 70 is incident on the document MS before being diffused over a wider area.

Consequently, it is possible to set the extent of diffusion of light incident on the document MS by adjusting the position of the light diffusing portion 70.

Figure 23:
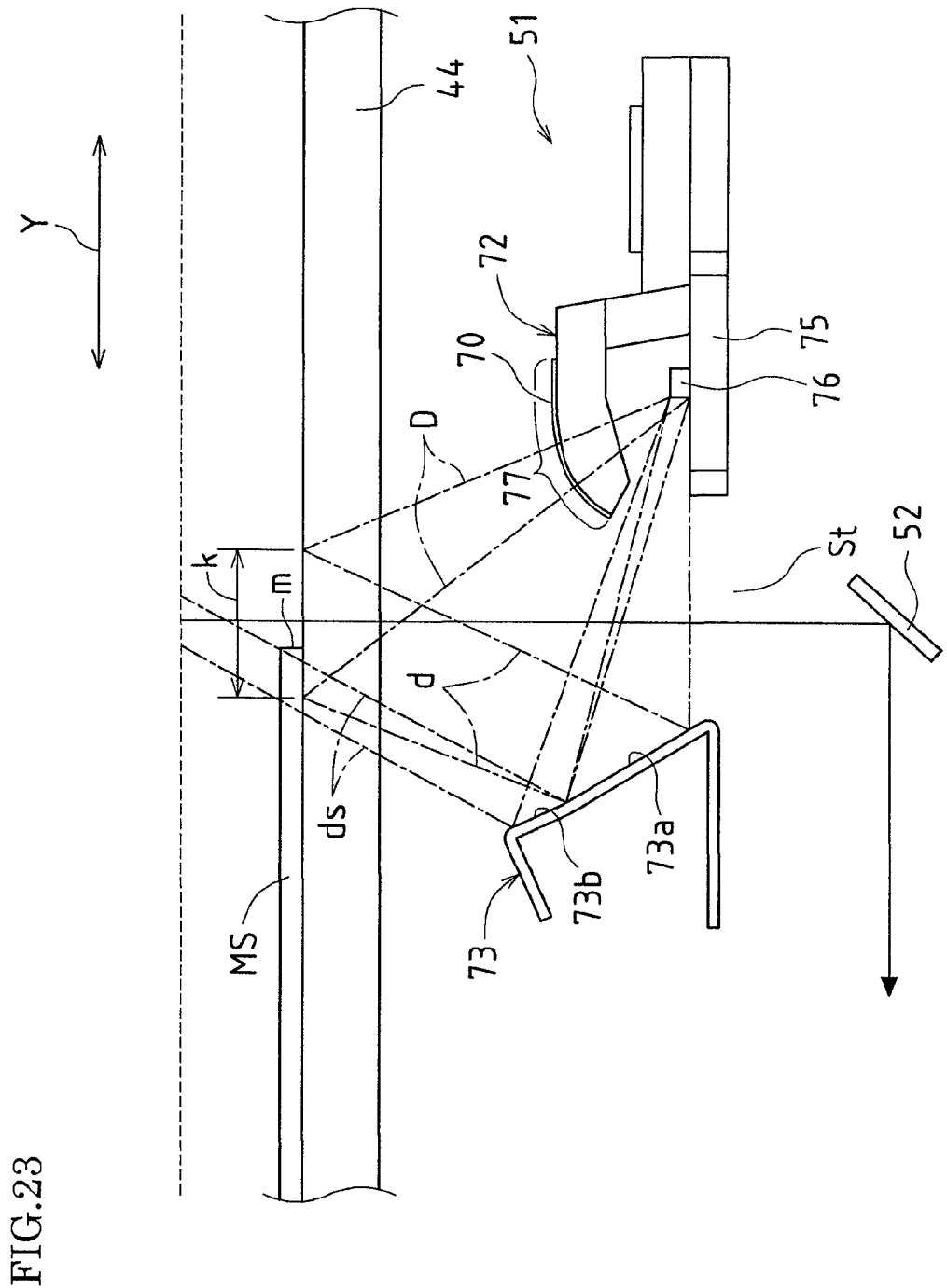
FIG. 23 is a cross-sectional view schematically illustrating a second modified example of the illuminating device of the first embodiment.

FIG. 23 is a cross-sectional view illustrating a second modification example of the illuminating device 51 of FIG. 3. In the second modification example, the indirect emitting portion 78 is removed from the light-guiding member 72, leaving only the direct emitting portion 77. The direct emitting portion 77 is cantilever-supported at the leg portion 77b of the right end 77a thereof.

In such a configuration, taking the optical path from the LED array 71 via the direct emitting portion 77 to the illumination range k as a first optical path D, the first optical path D is the shortest straight optical path from the LED array 71 to the illumination range k.

In addition, the light emitted from the LED array 71 is incident on the first reflecting face 73a of the light-reflecting plate 73, is reflected by it, and then incident on the illumination range k. Taking the optical path from the LED array 71 via the first reflecting face 73a to the illumination range k as a second optical path d, the second optical path d is an optical path that is bent at the first reflecting face 73a and longer than the first optical path D.

Furthermore, light emitted from the LED array 71 is incident on the second reflecting face 73b of the light-reflecting plate 73, is reflected by it, and then is incident on the illumination range ks whose position is 5 mm higher than the surface of the platen glass 44 and the document-reading glass 65. Taking the optical path from the LED array 71 via the second reflecting face 73b to the illumination range k as an auxiliary optical path ds, the auxiliary optical path ds is also an optical path that is bent at the second reflecting face 73b and longer than the first optical path D.

As the area of the inner flat face of the direct emitting portion 77 increases, the irradiation light amount from the first optical path D increases. Therefore the ratio between the irradiation light amount from the second optical path d and the irradiation light amount from the first optical path D is set to approximately 4.5:5.5 by appropriately adjusting and setting the area of the direct emitting portion 77.

Consequently, illumination via the first optical path D generates a large irradiation light amount, and thus the bright spots of the LEDs 76 are readily reflected by the document MS, thereby aggravating uneven illumination. Due to this, light in the first optical path D is diffused by the light diffusing portion 70 in the outer face (convex face) of the direct emitting portion 77, thereby reducing uneven illumination.

Figure 24:
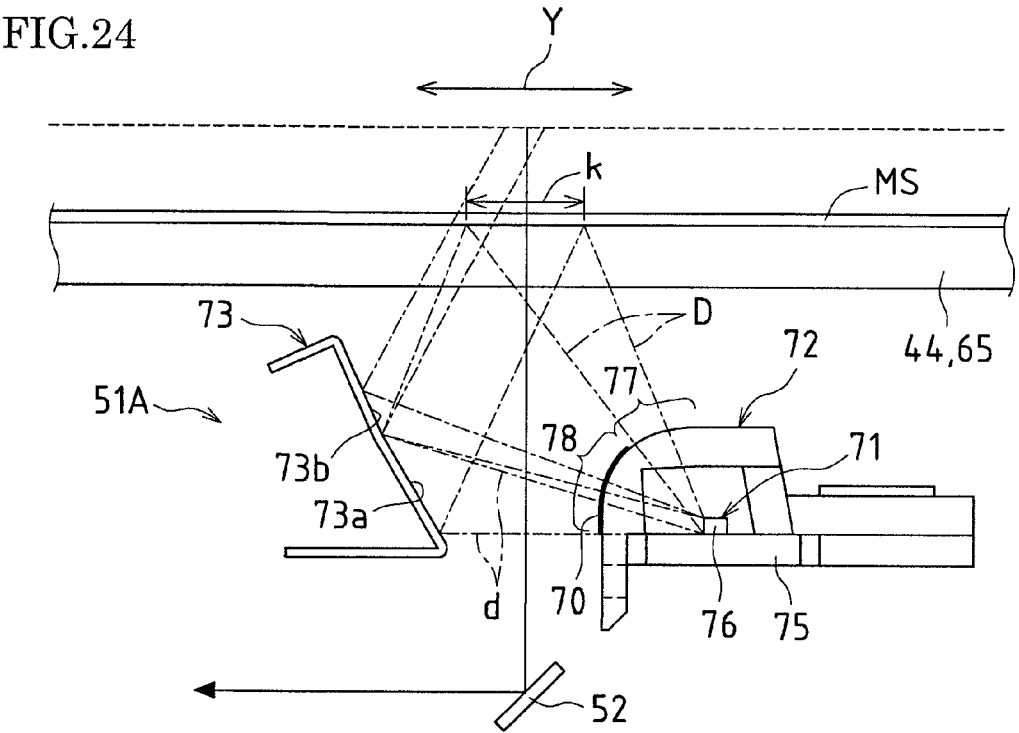
FIG. 24 is a cross-sectional view schematically illustrating an illuminating device of a second embodiment.

FIG. 24 is a cross-sectional view schematically showing an illuminating device 51A of a second embodiment. Note that in FIG. 24, portions that function similarly to those shown in FIG. 3 are given the same reference numerals.

The illuminating device 51A is used mounted on the first scanning unit 45 of FIG. 2, similarly to the illuminating device 51 of FIG. 3, and includes a substrate 75, an LED array 71 mounted on the substrate 75, a light-guiding member 72 supported on the substrate 75 in a fixed manner and a light-reflecting plate 73. In this illuminating device 51A as well, a first optical path D from the LED array 71 via the light-guiding member 72 to the document MS, and a second optical path d from the LED array 71 via the light-guiding member 72 and then the light-reflecting plate 73 to the document MS are set.

However, in the illuminating device 51A, the area of the indirect emitting portion 78 is set larger than the area of the direct emitting portion 77, and the irradiation light amount from the second optical path d is set to be larger than the irradiation light amount from the first optical path D. In this case, even though light in the first optical path D is not diffused, as clearly understood from the graph in FIG. 8, the fluctuation of the irradiation light amount can be made small by setting the irradiation light amount from the first optical path D to be appropriately small, and thus it is possible to make the uneven illumination hard to perceive. Also, since the irradiation light amount from the second optical path d is large, the irradiation light amount from the second optical path d greatly fluctuates if light in the second optical path d is not diffused, and thus uneven illumination is readily perceived.

Accordingly, in the illuminating device 51A, instead of providing the light diffusing portion 70 in the outer face (convex face) of the direct emitting portion 77, the light diffusing portion 70 is provided in the outer face (convex face) of the indirect emitting portion 78, that is, in the second optical path d.

As a result, light in the second optical path d having a larger irradiation light amount is diffused by the light diffusing portion 70 and uneven illumination is reduced, and thus the bright spots of the LEDs 76 are not reflected by the document MS.

Moreover, since the light diffusing portion is not provided in the first optical path D having a smaller irradiation light amount, wasteful light loss is not increased.

Figure 25:
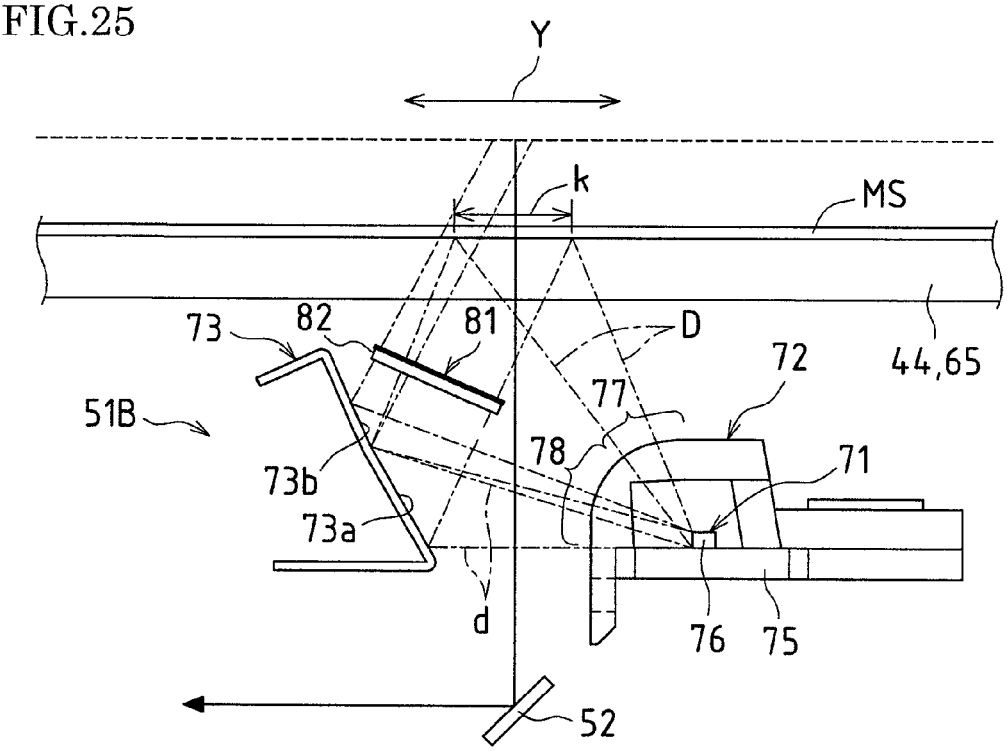
FIG. 25 is a cross-sectional view schematically illustrating an illuminating device of a third embodiment.

FIG. 25 is a cross-sectional view schematically showing an illuminating device 51B of a third embodiment. Note that in FIG. 25, portions that function similarly to those shown in FIG. 3 are given the same reference numerals.

Similar to the illuminating device 51 of FIG. 3, the illuminating device 51B is used mounted on the first scanning unit 45 of FIG. 2, and includes a substrate 75, an LED array 71 mounted on the substrate 75, a light-guiding member 72 supported on the substrate 75 in a fixed manner, and a light-reflecting plate 73. In the illuminating device 51B as well, a first optical path D from the LED array 71 via the light-guiding member 72 to the document MS, and a second optical path d from the LED array 71 via the light-guiding member 72 and then the light-reflecting plate 73 to the document MS are set.

Also in the illuminating device 51B, similar to the illuminating device 51A of FIG. 24, the area of the indirect emitting portion 78 is set larger than the area of the direct emitting portion 77, and thus the irradiation light amount from the second optical path d is set to be larger than the irradiation light amount from the first optical path D. Therefore, even though light in the first optical path D is not diffused, the fluctuation of the irradiation light amount can be made small by setting the irradiation light amount from the first optical path D to be appropriately small, and thus it is possible to make the uneven illumination hard to perceive. Also, since the irradiation light amount from the second optical path d is large, the irradiation light amount from the second optical path d greatly fluctuates if light in the second optical path d is not diffused, and thus uneven illumination is readily perceived.

Thus, in the illuminating device 51B, a light diffusing portion 81 is provided between the light-reflecting plate 73 and the document MS, namely, in the second optical path d. The light diffusing portion 81 is formed by, for example, processing the surface of a light-transmissive plate (light-transmissive member) 82 made of a glass plate, resin plate or the like having light transmission properties. This processing is performed by forming an asperity in a portion on the inner side of the mold corresponding to the surface of the light-transmissive plate 82, or applying a coat of paint having light dispersion properties to the surface of the light-transmissive plate 82. Alternatively, instead of processing the surface of the light-transmissive plate 82, particles having light dispersion properties may be dispersed in the light-transmissive plate 82, thereby forming the entire light-transmissive plate 82 as the light diffusing portion 81.

Light in the second optical path d is diffused by the light diffusing portion 81 and uneven illumination is reduced, and thus the bright spots of the LEDs 76 are not reflected by the document MS.

In addition, since the light diffusing portion is not provided in the first optical path D, wasteful light loss is not increased.

Figure 26:
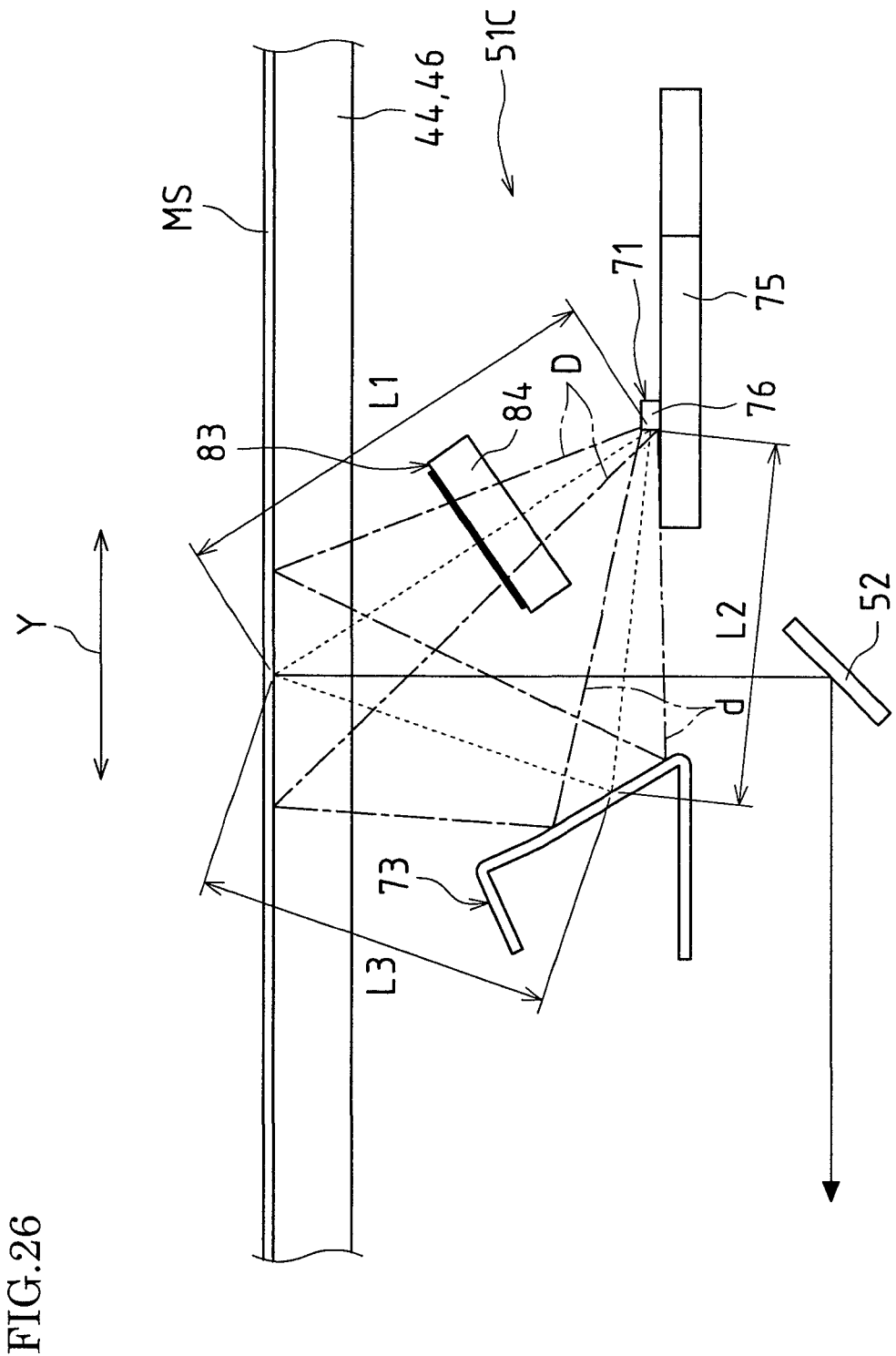
FIG. 26 is a cross-sectional view schematically illustrating an illuminating device of a fourth embodiment.

FIG. 26 is a cross-sectional view schematically showing an illuminating device 51C of a fourth embodiment. Note that in FIG. 26, portions that function similarly to those shown in FIG. 3 are given the same reference numerals.

The illuminating device 51C is used mounted on the first scanning unit 45 of FIG. 2, similarly to the illuminating device 51 of FIG. 3, and includes a substrate 75, an LED array 71 mounted on the substrate 75, and a light-reflecting plate 73. The light-guiding member 72 is removed and instead a light diffusing portion 83 is provided. In this illuminating device 51C as well, a first optical path D from the LED array 71 via the light diffusing portion 83 to the document MS, and a second optical path d from the LED array 71 via the light-reflecting plate 73 to the document MS are set.

The light diffusing portion 83 is formed by, for example, processing the surface of a light-transmissive plate (light-transmissive member) 84 made of a glass plate, resin plate or the like having light transmission properties. This processing is performed by forming an asperity in a portion on the inner side of the mold corresponding to the surface of the light-transmissive plate 84, or applying a coat of paint having light dispersion properties to the surface of the light-transmissive plate 84. Alternatively, instead of processing the surface of the light-transmissive plate 84, particles having light dispersion properties may be dispersed in the light-transmissive plate 84, thereby forming the entire light-transmissive plate 84 as the light diffusing portion 83. Note that the light-transmissive plate 84 may be formed in a convex lens shape, thereby giving the light diffusing portion 83 light collecting properties.

Here, when the distance of the first optical path D from the LED array 71 via the light diffusing portion 83 to the document MS is taken as L1, the distance of the second optical path d from the LED array 71 via the light-reflecting plate 73 to the document MS is taken as L2+L3, the relation, L1<L2+L3 is established. Here, the distance L2 represents the distance from the LED array 71 to the light-reflecting plate 73, and the distance L3 represents the distance from the light-reflecting plate 73 to the document MS.

Accordingly, the light diffusing portion 83 is provided in one of the first optical path D and the second optical path d having a shorter distance.

The reason for this is as follows. The irradiation light amount incident on the document MS via the first optical path D having a shorter distance is larger than the irradiation light amount incident on the document MS via the second optical path d having a longer distance, so with illumination via the first optical path D having a large irradiation light amount, the bright spots of the LEDs 76 are readily reflected by the document MS, which aggravates the uneven illumination. Therefore, light in the first optical path D is diffused by the light diffusing portion 83 so as to eradicate the bright spots of the LEDs 76 reflected by the document MS. Also, with illumination via the second optical path d having a small irradiation light amount, the bright spots of the LEDs 76 are hardly reflected by the document MS, so the light diffusing portion is not provided so as not to increase the light loss.

Figure 27:
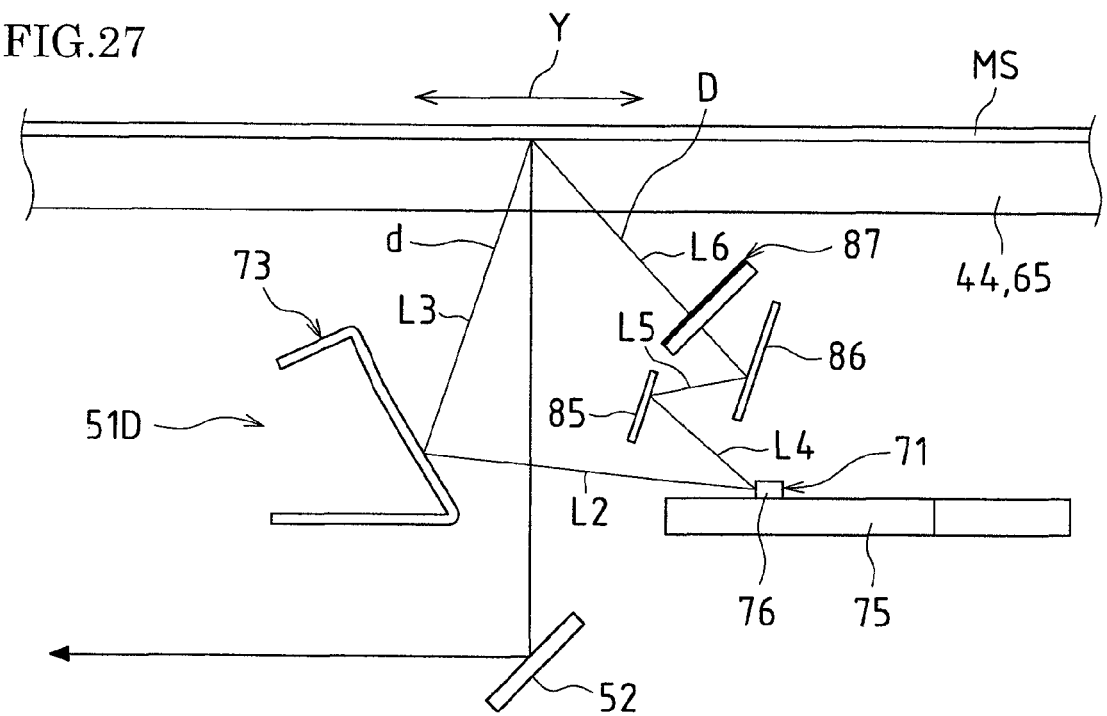
FIG. 27 is a cross-sectional view schematically illustrating an illuminating device of a fifth embodiment.

FIG. 27 is a cross-sectional view schematically showing an illuminating device 51D of a fifth embodiment. Note that in FIG. 27, portions that function similarly to those shown in FIG. 3 are given the same reference numerals.

The illuminating device 51D is used mounted on the first scanning unit 45 of FIG. 2, similarly to the illuminating device 51 of FIG. 3, and includes a substrate 75, an LED array 71 mounted on the substrate 75, and a light-reflecting plate 73. The light-guiding member 72 is removed and instead two auxiliary reflecting plates 85 and 86 and a light diffusing portion 87 are provided. The light diffusing portion 87 is formed by, similar to the light diffusing portions 81 and 83, processing the surface of the light-transmissive plate, applying a coat of paint having light dispersion properties to the surface of the light-transmissive plate, or dispersing particles having light dispersion properties in the light-transmissive plate.

In this illuminating device 51D as well, a first optical path D from the LED array 71 via the auxiliary reflecting plates 85 and 86 and then the light diffusing portion 87 to the document MS, and a second optical path d from the LED array 71 via the light-reflecting plate 73 to the document MS are set.

Although the first optical path D is bent by the auxiliary reflecting plates 85 and 86, when the distance of the first optical path D is taken as L4+L5+L6, and the distance of the second optical path d is taken as L2+L3, the relation, L4+L5+

L6<L2+L3 is established. Accordingly, the first optical path D is shorter than the second optical path d and the irradiation light amount irradiated on the document MS via the first optical path D is larger than the irradiation light amount irradiated on the document MS via the second optical path d. Therefore, the irradiation light amount from the first optical path D greatly fluctuates if light in the first optical path D is not diffused, and thus uneven illumination is readily perceived. In addition, even though light in the second optical path d is not diffused, the fluctuation of the irradiation light amount can be made small by setting the irradiation light amount from the second optical path d to be appropriately small, and thus it is possible to make the uneven illumination hard to perceive.

In the illuminating device 51D, since the light diffusing portion 87 is provided in the first optical path D, light in the first optical path D is diffused by the light diffusing portion 87, thereby enabling to sufficiently suppress uneven illumination due to light irradiated from the first optical path D. Also, since the light diffusing portion is not provided in the second optical path d, wasteful light loss is not increased.

Furthermore, in the illuminating device 51D, the distance of the first optical path D is elongated by bending the first optical path D by the auxiliary reflecting plates 85 and 86, and therefore the irradiation light amount on the document MS from the first optical path D is reduced and thus the fluctuation of the irradiation light amount becomes small. Consequently, even if the degree of light diffusion by the light diffusing portion 87 is decreased, uneven illumination due to light irradiated from the first optical path D can be sufficiently suppressed.

Figure 28:
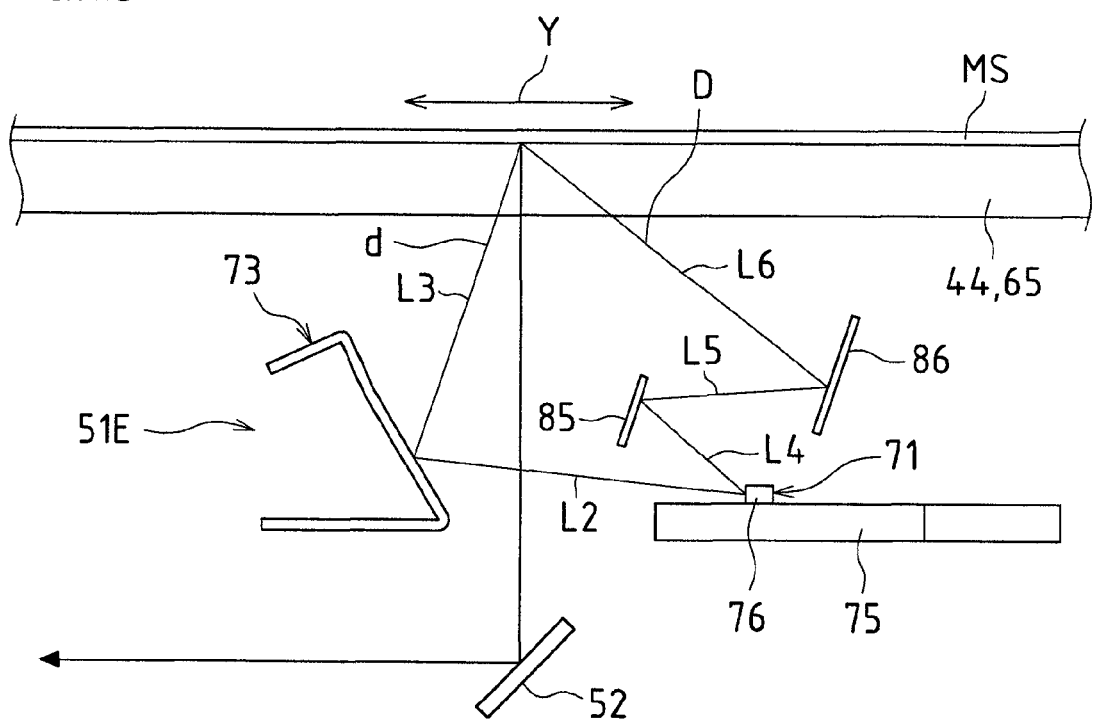
FIG. 28 is a cross-sectional view schematically illustrating an illuminating device of a sixth embodiment.

FIG. 28 is a cross-sectional view schematically showing an illuminating device 51E of a sixth embodiment. Note that in FIG. 28, portions that function similarly to those shown in FIG. 3 are given the same reference numerals.

In the illuminating device 51E, although the light diffusing portion 87 of the illuminating device 51D of FIG. 27 is removed, the auxiliary reflecting plates 85 and 86 are left and the reflecting face of at least one of the auxiliary reflecting plates 85 and 86 is roughened. The reflecting face is roughened by sandblasting, for example.

In the illuminating device 51E, similar to the illuminating device 51D of FIG. 27, the first optical path D is shorter than the second optical path d and the irradiation light amount irradiated on the document MS via the first optical path D is larger than the irradiation light amount irradiated on the document MS via the second optical path d. Therefore, the irradiation light amount from the first optical path D greatly fluctuates if light in the first optical path D is not diffused, and thus uneven illumination is readily perceived. In addition, even though light in the second optical path d is not diffused, the fluctuation of the irradiation light amount can be made small by setting the irradiation light amount from the second optical path d to be appropriately small, and thus it is possible to make the uneven illumination hard to perceive.

In the illuminating device 51E, since the reflecting face of at least one of the auxiliary reflecting plates 85 and 86 is roughened, light in the first optical path D can be diffused by the roughened reflecting face (light diffusing portion). Consequently, uneven illumination due to light irradiated from the first optical path D can be sufficiently suppressed. Also, since the light diffusing portion is not provided in the second optical path d, wasteful light loss is not increased.

In addition, in the illuminating device 51E, the distance of the first optical path D is elongated by bending the first optical path D by the auxiliary reflecting plates 85 and 86, and therefore the irradiation light amount on the document MS from the first optical path D is reduced and thus the fluctuation of the irradiation light amount on the document MS from the first optical path D becomes small. Consequently, even if the degree of light diffusion by the reflecting face of at least one of the auxiliary reflecting plates 85 and 86 that has been roughened is decreased, uneven illumination due to light irradiated from the first optical path D can be sufficiently suppressed.

FIG. 29 is a cross-sectional view schematically showing an illuminating device 51F of a seventh embodiment. Note that in FIG. 29, portions that function similarly to those shown in FIG. 3 are given the same reference numerals.

The illuminating device 51F is used mounted on the first scanning unit 45 of FIG. 2, similarly to the illuminating device 51 of FIG. 3, and includes a first LED array 91, a second LED array 92, substrates 95 and 96 on which the first and the second LED arrays 91 and 92 are respectively mounted, and a light diffusing portion 93. That is, the illuminating device 51F includes two lines of light-emitting elements (the first and the second LED arrays 91 and 92), each line including a plurality of light-emitting elements arranged in a line.

Here, the substrates 95 and 96 are provided inclined in order to direct the light-emitting direction of the first and the second LED arrays 91 and 92 on the substrates 95 and 96 toward the illumination range k on the surface of the platen glass 44 and the document-reading glass 65.

The light diffusing portion 93 is formed by, for example, processing the surface of a light-transmissive plate (light-transmitting member) 94 made of a glass plate, resin plate or the like having light transmission properties. This processing is performed by forming an asperity in a portion on the inner side of the mold corresponding to the surface of the light-transmissive plate 94, or applying a coat of paint having light dispersion properties to the surface of the light-transmissive plate 94. Alternatively, particles having light dispersion properties may be dispersed in the light-transmissive plate 94, thereby forming the entire light-transmissive plate 94 as the light diffusing portion 93.

In this illuminating device 51F, an optical path from the LED array 91 on the left side to illumination range k (document MS) is taken as a first optical path D, and an optical path from the LED array 92 on the right side to the document MS is taken as a second optical path d. Then, the irradiation light amount from the first optical path D is set to be larger than the irradiation light amount from the second optical path d.

For example, the emitted light amounts of the first and the second LED arrays 91 and 92 are set to be equal, the distance of the first optical path D is set to be shorter than that of the second optical path d, and the irradiation light amount from the first optical path D is set to be larger than the irradiation light amount from the second optical path d. Also, the distances of the first optical path D and the second optical path d are set to be equal, the emitted light amount of the first LED array 91 is set to be larger than the emitted light amount of the second LED array 92, and the irradiation light amount from the first optical path D is set to be larger than the irradiation light amount from the second optical path d. Alternatively, while the distance of the first optical path D is set to be longer than that of the second optical path d, the emitted light amount of the first LED array 91 is set to be significantly larger that the emitted light amount of the second LED array 92, so as to set the irradiation light amount from the first optical path D to be larger than the irradiation light amount from the second optical path d.

As a result of the irradiation light amount irradiated on the document MS via the first optical path D being set to be larger than the irradiation light amount irradiated on the document MS via the second optical path d in this manner, the irradiation light amount from the first optical path D greatly fluctuates if light in the first optical path D is not diffused, and thus uneven illumination is readily perceived. Also, even though light in the second optical path d is not diffused, the fluctuation of the irradiation light amount can be made small by setting the irradiation light amount from the second optical path d to be appropriately small, and thus it is possible to make the uneven illumination hard to perceive.

In the illuminating device 51F, the light diffusing portion 93 is provided between the first LED array 91 on the left side and the document MS, that is, in the first optical path D, and therefore light in the first optical path D having a larger irradiation light amount is diffused by the light diffusing portion 93, thereby enabling to sufficiently suppress uneven illumination due to light irradiated from the first optical path D. Also, since the light diffusing portion is not provided in the second optical path d having a smaller irradiation light amount, wasteful light loss is not increased.

FIG. 30 is a cross-sectional view schematically showing an illuminating device 51G of an eighth embodiment. Note that in FIG. 30, portions that function similarly to those shown in FIG. 3 are given the same reference numerals.

In the illuminating device 51G, the light diffusing portion 93 of the illuminating device 51F in FIG. 29 is removed, and on the light emitting side of the first and the second LED arrays 91 and 92, the light-transmissive plates (light-transmitting member) 97 and 98 are respectively provided, and a light diffusing portion 99 is provided in the light emitting face of the light-transmissive plate 97 of the first LED array 91 on the left side. The light diffusing portion 99 in the surface of the light-transmissive plate 97 is formed by processing the light emitting face of the light-transmissive plate 97. This processing is performed by forming an asperity in a portion on the inner side of the mold corresponding to the light emitting face of the light-transmissive plate 97, or applying a coat of paint having light dispersion properties to the light emitting face of the light-transmissive plate 97.

In the illuminating device 51G, an optical path in which light emitted from the first LED array 91 on the left side is transmitted through the light-transmissive plate 97 and is irradiated on the document MS is taken as a first optical path D, and an optical path in which light emitted from the second LED array 92 on the right side is transmitted through the light-transmissive plate 98 and is irradiated on the document MS is taken as a second optical path d. Then, the irradiation light amount from the first optical path D is set to be larger than the irradiation light amount from the second optical path d.

The method of setting the irradiation light amount from the first optical path D to be larger than the irradiation light amount from the second optical path d is the same as that of the illuminating device 51F of FIG. 29.

As a result of irradiation light amount from the first optical path D being set to be larger than the irradiation light amount from the second optical path d in this manner, the irradiation light amount from the first optical path D greatly fluctuates if light in the first optical path D is not diffused, and thus uneven illumination is readily perceived. Also, even though light in the second optical path d is not diffused, the fluctuation of the irradiation light amount can be made small by setting the irradiation light amount from the second optical path d to be appropriately small, and thus it is possible to make the uneven illumination hard to perceive.

In the illuminating device 51G, the light diffusing portion 99 is provided in the light emitting face of the light-transmissive plate 97 on the left side, that is, in the first optical path D, and therefore light in the first optical path D is diffused by the light diffusing portion 99, thereby enabling to sufficiently suppress uneven illumination due to light irradiated from the first optical path D. Also, since the light diffusing portion is not provided in the second optical path d, wasteful light loss is not increased.

Note that in the foregoing embodiments, although in the LED array 71, a plurality of the LEDs 76 are arranged in a single line in the main scanning direction X, there is no limitation to this. The plurality of LEDs 76 may be arranged in two lines in the main scanning direction X. In such a configuration, one of the first optical path D and the second optical path d serves as the optical path in which light emitted from a plurality of LEDs 76 of one of the two lines is irradiated on the irradiation target. Also, the other path serves as the optical path in which light emitted from a plurality of LEDs 76 of the other line is irradiated on the irradiation target.

Note that the present invention is not limited to the foregoing embodiments, and may be modified in various manners. For example, the foregoing embodiments may be combined with each other.

Also, the illuminating device of the present invention may be applied not only to image-reading apparatuses or image-forming apparatuses, but also to other electronic devices. For example, the illuminating device of the present invention may be applied as a back light of liquid crystal displays.

It should be noted that the present invention can be embodied and practiced in other different forms without departing from the spirit, gist or essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An illuminating device comprising:
a plurality of light-emitting elements arranged in a line, the illuminating device illuminating an irradiation target by irradiating the irradiation target with light that is emitted from the light-emitting elements via a first and a second optical paths,
wherein a light diffusing portion for diffusing light is provided in one of the first optical path and the second optical path,
wherein an irradiation light amount of said one of the first optical path and the second optical path in which the light diffusing portion is provided is larger than an irradiation light amount of the other optical path,
wherein the first optical path is an optical path in which light emitted from the light-emitting elements is irradiated on the irradiation target directly or after having been transmitted through a light-transmitting member,
wherein the second optical path is an optical path in which light emitted from the light-emitting elements is reflected by a reflecting member and irradiated on the irradiation target, and
wherein the light diffusing portion is provided in a portion of the light-transmitting member that is closer to the irradiation target than to the light-emitting elements.

2. An illuminating device comprising:
a plurality of light-emitting elements arranged in a line, the illuminating device illuminating an irradiation target by irradiating the irradiation target with light that is emitted from the light-emitting elements via a first and a second optical paths, wherein a light diffusing portion for diffusing light is provided in one of the first optical path and the second optical path, wherein an irradiation light amount of said one of the first optical path and the second optical path in which the light diffusing portion is provided is larger than an irradiation light amount of the other optical path, wherein the first optical path is an optical path in which light emitted from the light-emitting elements is irradiated on the irradiation target directly or after having been transmitted through a light-transmitting member, wherein the second optical path is an optical path in which light emitted from the light-emitting elements is reflected by a reflecting member and irradiated on the irradiation target, and wherein the light diffusing portion is provided in a portion of the light-transmitting member that is closer to the light-emitting elements than to the irradiation target.

3. An illuminating device comprising:

a plurality of light-emitting elements arranged in a line, the illuminating device illuminating an irradiation target by irradiating the irradiation target with light that is emitted from the light-emitting elements via a first and a second optical paths, wherein a light diffusing portion for diffusing light is provided in one of the first optical path and the second optical path, wherein an irradiation light amount of said one of the first optical path and the second optical path in which the light diffusing portion is provided is larger than an irradiation light amount of the other optical path, and wherein the light diffusing portion is formed by roughening a surface of a light-transmitting member provided in an optical path having a larger irradiation light amount on the irradiation target, applying a coat of light dispersion paint to the surface of the light-transmitting member, or dispersing light dispersing particles in the light-transmitting member.

4. An image-reading apparatus comprising the illuminating device according to claim 3.

5. An image-forming apparatus comprising the image-reading apparatus according to claim 4.

6. An illuminating device comprising:

a plurality of light-emitting elements arranged in a line, the illuminating device illuminating an irradiation target by irradiating the irradiation target with light that is emitted from the light-emitting elements via a first and a second optical paths, wherein a light diffusing portion is provided in one of the first optical path and the second optical path, the light diffusing portion for diffusing light in a direction in which the plurality of light-emitting elements is arranged in a line, an irradiation light amount of said one of the first optical path and the second optical path in which the light diffusing portion is provided is larger than an irradiation light amount of the other optical path, and wherein the light diffusing portion is formed by roughening a surface of a light-transmitting member provided in an optical path having a larger irradiation light amount on the irradiation target, applying a coat of light dispersion paint to the surface of the light-transmitting member, or dispersing light dispersing particles in the light-transmitting member.

* * * * *